(12) United States Patent
Kawamoto et al.

(10) Patent No.: US 10,843,628 B2
(45) Date of Patent: Nov. 24, 2020

(54) ONBOARD DISPLAY DEVICE, CONTROL METHOD FOR ONBOARD DISPLAY DEVICE, AND CONTROL PROGRAM FOR ONBOARD DISPLAY DEVICE

(71) Applicant: Toyota Jidosha Kabushiki Kaisha, Toyota (JP)

(72) Inventors: Masashi Kawamoto, Okazaki (JP); Takayuki Aoki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 251 days.

(21) Appl. No.: 15/888,784

(22) Filed: Feb. 5, 2018

(65) Prior Publication Data

US 2018/0265002 A1 Sep. 20, 2018

(30) Foreign Application Priority Data

Mar. 17, 2017 (JP) .................................. 2017-053306

(51) Int. Cl.
*B60R 1/00* (2006.01)
*G09G 5/00* (2006.01)
(Continued)

(52) U.S. Cl.
CPC ................ *B60R 1/00* (2013.01); *G06F 3/013* (2013.01); *G06F 3/1423* (2013.01);
(Continued)

(58) Field of Classification Search
CPC ................ B60R 1/00; B60R 2300/306; B60R 2300/8066; B60R 2300/8046;
(Continued)

(56) References Cited

U.S. PATENT DOCUMENTS

2002/0067366 A1* 6/2002 Hirao ..................... B60K 35/00
345/660
2003/0035050 A1* 2/2003 Mizusawa ............... G06T 15/10
348/148
(Continued)

FOREIGN PATENT DOCUMENTS

JP H04139974 A 5/1992
JP 2003-081014 A 3/2003
(Continued)

*Primary Examiner* — Richard A Hansell, Jr.
(74) *Attorney, Agent, or Firm* — Dinsmore & Shohl LLP

(57) ABSTRACT

An onboard display device that includes: a display that includes a display region at a front passenger seat side of a vehicle width direction center position at a front face side of a vehicle cabin, and that is capable of displaying a picture in the display region; and a display controller that converts a second image captured by a second image capture section to a point-of-view-converted image viewed as if from a hypothetical point-of-view at an installation position of a first image capture section, that stitches a first image captured by the first image capture section with an image from a range in the point-of-view-converted image not overlapping with the first image to generate a composite image, and that controls the display so as to display the composite image in the display region as the picture.

17 Claims, 11 Drawing Sheets

(51) Int. Cl.
  *G09G 5/14*    (2006.01)
  *G06F 3/14*    (2006.01)
  *G06K 9/00*    (2006.01)
  *H04N 5/232*   (2006.01)
  *G06T 3/40*    (2006.01)
  *G06F 3/01*    (2006.01)
  *G06T 11/60*   (2006.01)
  *H04N 5/247*   (2006.01)
  *G02B 27/01*   (2006.01)
  *H04N 5/262*   (2006.01)

(52) U.S. Cl.
  CPC ..... *G06K 9/00604* (2013.01); *G06K 9/00845* (2013.01); *G06T 3/4038* (2013.01); *G06T 11/60* (2013.01); *G09G 5/00* (2013.01); *G09G 5/14* (2013.01); *H04N 5/23238* (2013.01); *H04N 5/247* (2013.01); *B60R 2300/105* (2013.01); *B60R 2300/303* (2013.01); *B60R 2300/306* (2013.01); *B60R 2300/605* (2013.01); *B60R 2300/8046* (2013.01); *B60R 2300/8066* (2013.01); *G02B 27/01* (2013.01); *G02B 2027/0138* (2013.01); *G09G 2340/045* (2013.01); *G09G 2340/0464* (2013.01); *G09G 2380/10* (2013.01); *H04N 5/23219* (2013.01); *H04N 5/2628* (2013.01)

(58) Field of Classification Search
  CPC ........ B60R 2300/605; B60R 2300/303; B60R 2300/105; B60R 2300/304; G06T 3/4038; G06T 11/60; H04N 5/23238; H04N 5/247; H04N 5/2628; H04N 5/23219; G06K 9/00604; G06K 9/00845; G06F 3/1423; G06F 3/013; G09G 5/14; G09G 5/00; G09G 2340/045; G09G 2380/10; G09G 2340/0464; G02B 2027/0138; G02B 27/01
  See application file for complete search history.

(56) References Cited

U.S. PATENT DOCUMENTS

| | | | |
|---|---|---|---|
| 2003/0210535 A1* | 11/2003 | Gaides | G02F 1/1323 362/23.01 |
| 2006/0071877 A1* | 4/2006 | Kanamori | G02B 27/0101 345/7 |
| 2009/0256813 A1* | 10/2009 | Amici | B60K 35/00 345/173 |
| 2011/0181728 A1* | 7/2011 | Tieman | B60R 1/00 348/148 |
| 2012/0215403 A1* | 8/2012 | Tengler | B60K 37/06 701/36 |
| 2013/0194426 A1 | 8/2013 | Schofield et al. | |
| 2015/0234459 A1* | 8/2015 | George-Svahn | B60K 35/00 345/156 |
| 2016/0209647 A1* | 7/2016 | Fursich | G02B 27/0093 |
| 2017/0153670 A1* | 6/2017 | Kim | G06F 1/1652 |
| 2017/0347067 A1* | 11/2017 | Bostrom | G10L 15/22 |
| 2017/0364148 A1* | 12/2017 | Kim | G09G 5/14 |

FOREIGN PATENT DOCUMENTS

| | | | | |
|---|---|---|---|---|
| JP | 2008-001120 A | | 1/2008 | |
| JP | 2009-042356 A | | 2/2009 | |
| JP | 2011-213186 A | | 10/2011 | |
| JP | 2012-113672 A | | 6/2012 | |
| JP | 2014-204132 A | | 10/2014 | |
| JP | 2014204132 A | * | 10/2014 | ............... G06T 3/00 |
| JP | 2014-229997 A | | 12/2014 | |
| JP | 2016-055801 A | | 4/2016 | |
| JP | 2016055801 A | * | 4/2016 | |
| JP | 2016-074290 A | | 5/2016 | |
| JP | 2016-172526 A | | 9/2016 | |
| JP | 2016-175586 A | | 10/2016 | |
| JP | 2016175586 A | * | 10/2016 | |
| JP | 2016-220011 A | | 12/2016 | |

* cited by examiner

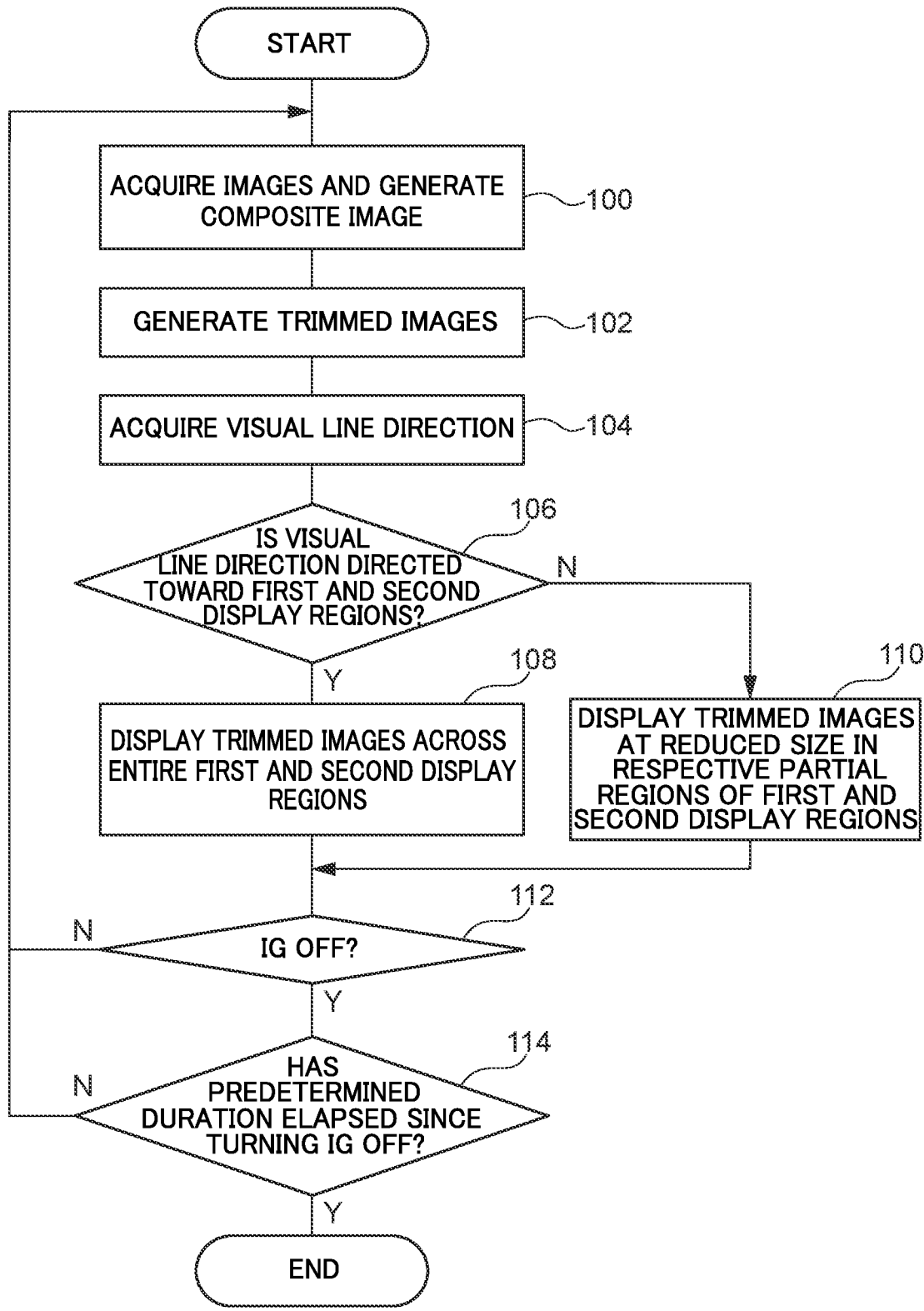

ONBOARD DISPLAY DEVICE, CONTROL METHOD FOR ONBOARD DISPLAY DEVICE, AND CONTROL PROGRAM FOR ONBOARD DISPLAY DEVICE

CROSS-REFERENCE TO RELATED APPLICATION

This application is based on and claims priority under 35 USC 119 from Japanese Patent Application No. 2017-053306 filed on Mar. 17, 2017, which is incorporated by reference herein.

BACKGROUND

Technical Field

The present disclosure relates to an onboard display device, a control method for the onboard display device, and a non-transitory storage medium storing a control program for the onboard display device.

Related Art

Technology that assists vehicle driving is known (Japanese Patent Application Laid-Open (JP-A) Nos. 2014-204132, 2012-113672, 2008-1120, 2003-81014). For example, JP-A No. 2014-204132 describes technology relating to a device that displays a picture external to a vehicle inside the vehicle. To explain briefly, this related technology displays a picture captured by plural cameras installed on the vehicle using plural display modes, in plural display regions of a dashboard display or the like. The display is, for example, disposed in a range in front of a front passenger seat, at the oblique front left of a driving seat. From the left, a picture of a rear left region imaged by a left camera provided to a door at the side of the front passenger seat and picture of a rear central region imaged by a rear camera provided at a rear end of the vehicle are displayed side-by-side in this sequence.

However, in the related technology described above, for example, sometimes the positional relationship between the picture of the rear left region and the picture of the rear central region is unintuitive, leaving room for improvement in terms of ease of viewing.

SUMMARY

In consideration of the above circumstances, an object of the present disclosure is to obtain an onboard display device, a control method for the onboard display device, and a control program for the onboard display device that are capable of improving the ease of viewing of a displayed picture.

An onboard display device of an aspect includes a display section, a first image capture section, a second image capture section, and a display controller. The display section includes a display region set on a front passenger seat side of a vehicle width direction center position at a front face side of a vehicle cabin, and is capable of displaying a picture in the display region. The first image capture section is disposed at a vehicle side section on the front passenger seat side and captures images of a vehicle rearward. The second image capture section is disposed at a vehicle rear end section, and captures images of the vehicle rearward in an imaging range partially overlapping with an imaging range of the first image capture section. The display controller converts a second image captured by the second image capture section to a point-of-view-converted image viewed as if from a hypothetical point-of-view at an installation position of the first image capture section, and stitches (or combines) a first image captured by the first image capture section together with an image from a range in the point-of-view-converted image not overlapping with the first image to generate a composite image. The display controller then controls the display section so as to display the composite image in the display region as the picture.

BRIEF DESCRIPTION OF DRAWINGS

FIG. 6 is a flowchart illustrating an example of a flow of processing executed by a control device of an onboard display device according to the first exemplary embodiment.

DESCRIPTION OF EMBODIMENTS

First Exemplary Embodiment

Figure 1:
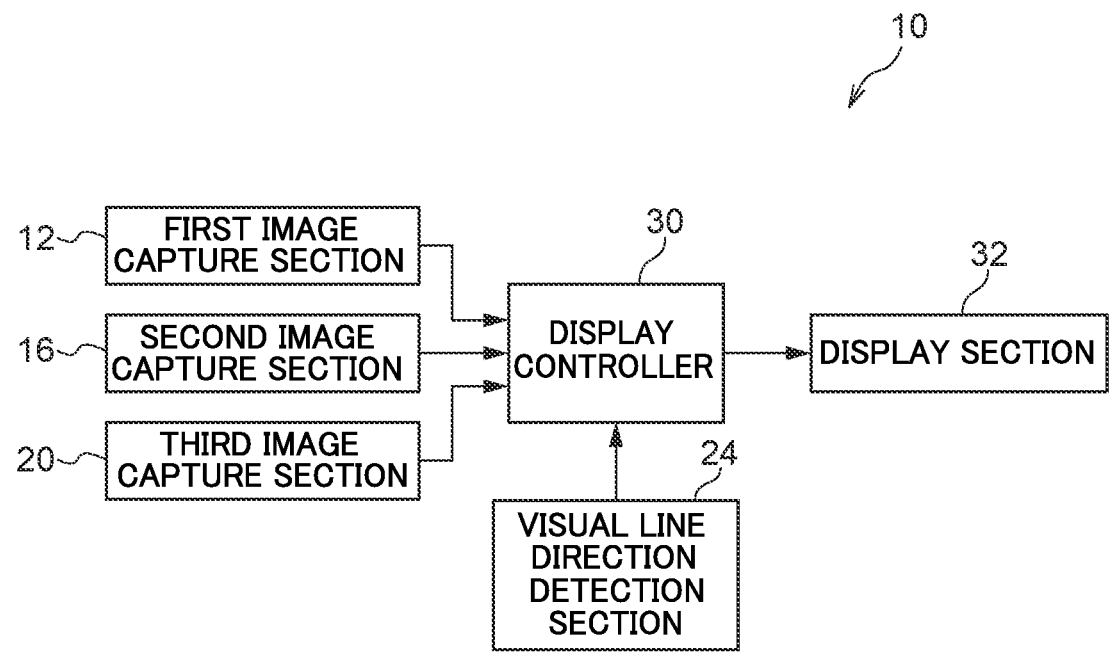
FIG. 1 is a block diagram illustrating an example of a schematic configuration of an onboard display device according to a first exemplary embodiment.
Figure 2:
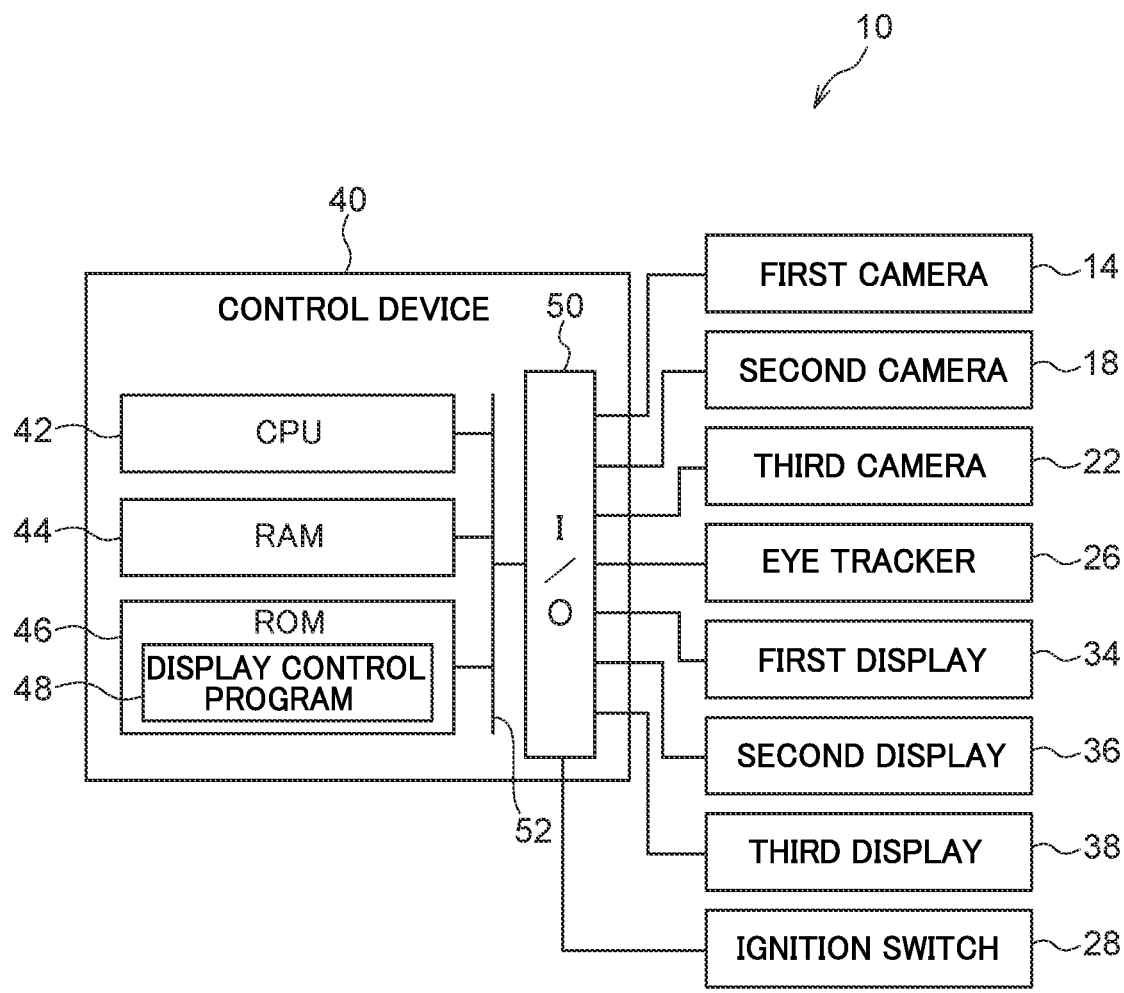
FIG. 2 is a block diagram illustrating an example of a schematic configuration of a control device and of an external device connected to the control device in an onboard display device according to the first exemplary embodiment.
Figure 3:
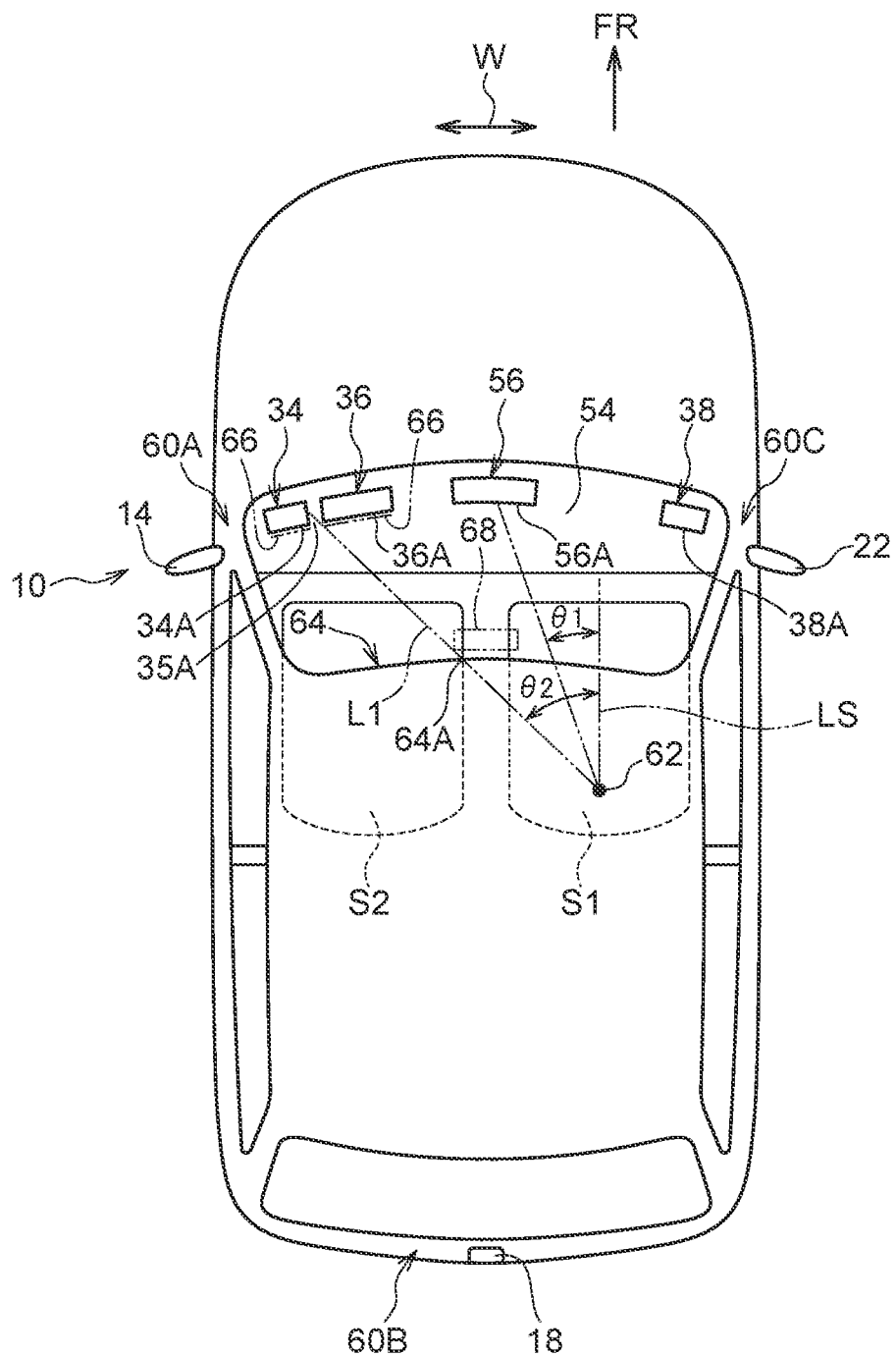
FIG. 3 is a schematic plan view illustrating an example of installation positions of cameras, displays, and the like in an onboard display device according to the first exemplary embodiment.

Explanation follows regarding an onboard display device, a control method for the onboard display device, and a control program for the onboard display device according to a first exemplary embodiment of the present disclosure, with reference to FIG. 1 to FIG. 7C. FIG. 1 is a block diagram illustrating schematic configuration of an onboard display device 10 according to the present exemplary embodiment. FIG. 3 is a schematic plan view illustrating installation positions of configuration sections and the like of the onboard display device 10. Note that in FIG. 3, the arrow FR indicates the vehicle front, and the arrow W indicates the vehicle width direction.

The onboard display device 10 is installed onboard a vehicle, and is a device that displays pictures based on images captured rearward of the vehicle in order to assist a driver with vehicle driving. As illustrated in FIG. 1, the onboard display device 10 is configured including a first image capture section 12, a second image capture section 16, a third image capture section 20, a visual line direction detection section 24, a display controller 30, and a display section 32.

The first image capture section 12 includes a first camera 14 disposed at a vehicle side section 60A (for example, a position where a normal left door mirror is provided) at the side of a front passenger seat S2 illustrated in FIG. 3. The first image capture section 12 is a functional section that uses the first camera 14 to capture images of the vehicle rearward, and outputs the captured images. The second image capture section 16 illustrated in FIG. 1 includes a second camera 18 disposed at a vehicle rear end section 60B illustrated in FIG. 3 (for example, above the rear license plate). The second image capture section 16 is a functional section that uses the second camera 18 to capture images of the vehicle rearward, and outputs the captured images. The third image capture section 20 illustrated in FIG. 1 includes a third camera 22 disposed at a vehicle side section 60C (for example, a position where a normal right door mirror is provided) at the side of a driving seat S1 illustrated in FIG. 3. The third image capture section 20 is a functional section that uses the third camera 22 to capture images of the vehicle rearward, and outputs the captured images.

Figure 4:
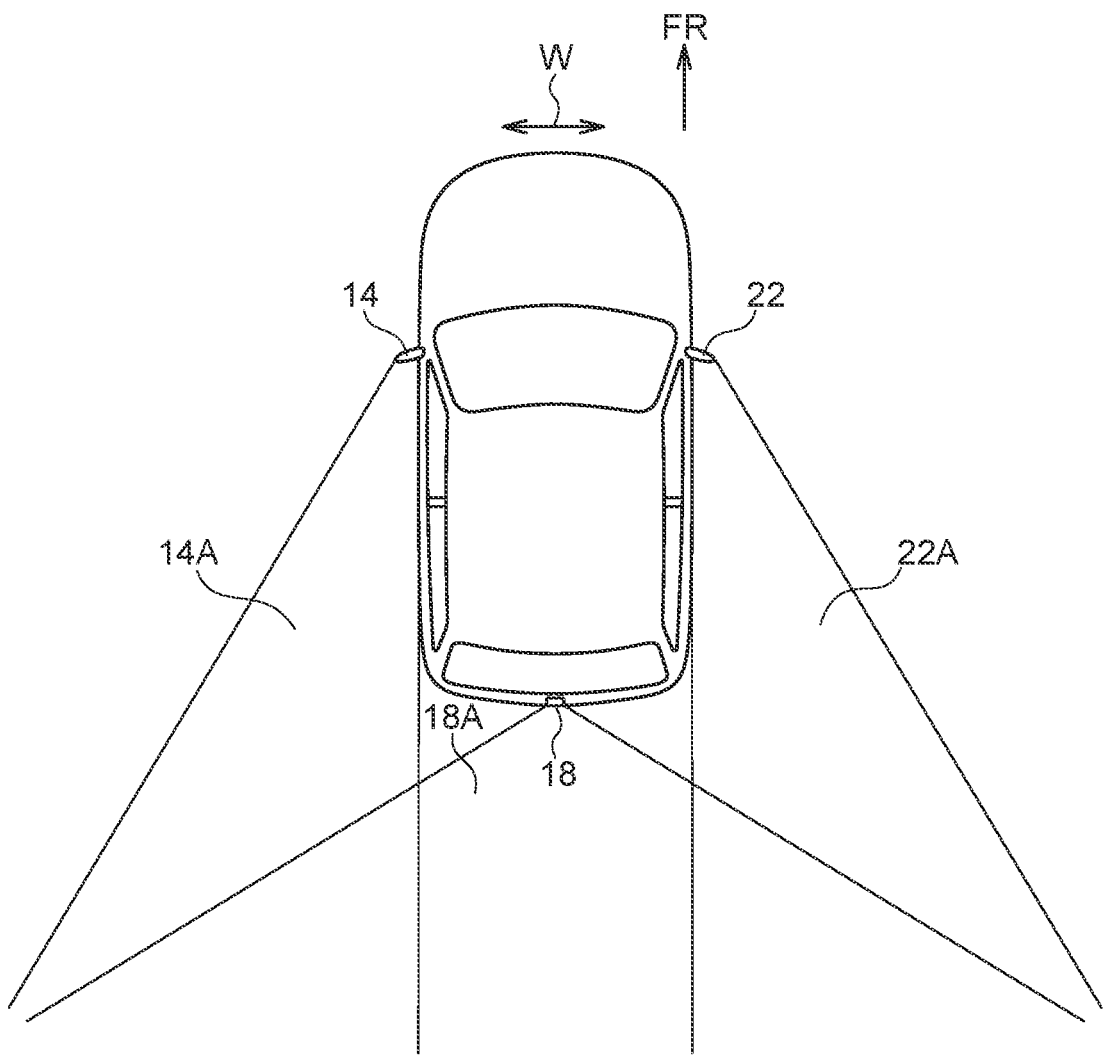
FIG. 4 is a schematic plan view illustrating imaging ranges of cameras of an onboard display device according to the first exemplary embodiment.

FIG. 4 is a schematic plan view illustrating an example of imaging ranges (in other words, the fields of view) of the first camera 14, the second camera 18, and the third camera 22. In FIG. 4, the imaging range of the first camera 14 is indicated by the reference numeral 14A, the imaging range of the second camera 18 is indicated by the reference numeral 18A, and the imaging range of the third camera 22 is indicated by the reference numeral 22A. As illustrated in FIG. 4, the imaging range 18A of the second camera 18 (the second image capture section 16 (see FIG. 1)) is set so as to partially overlap with the imaging range 14A of the first camera 14 (the first image capture section 12 (see FIG. 1)). Moreover, the imaging range 18A of the second camera 18 is set so as to partially overlap with the imaging range 22A of the third camera 22 (the third image capture section 20 (see FIG. 1)).

The visual line direction detection section 24 illustrated in FIG. 1 is a functional section that detects the visual line direction of the driver of the vehicle. In the present exemplary embodiment, as an example, the visual line direction detection section 24 includes an eye tracker 26 (see FIG. 2) capable of detecting the visual line direction of the driver based on rotation motion of the pupil and changes in the reflectivity of the cornea. Note that in the present exemplary embodiment, the visual line direction of the driver is detected using the eye tracker 26 (see FIG. 2) as an example. However, the visual line direction of the driver may also be detected using image recognition. For example, the gaze of the driver may be detected by image recognition using images captured by an onboard camera.

The first image capture section 12, the second image capture section 16, the third image capture section 20, and the visual line direction detection section 24 are connected to the display controller 30. The display controller 30 will be described in detail later. The display section 32 is also connected to the display controller 30.

The display section 32 is a functional section capable of displaying picture in a first display region 34A, a second display region 36A, and a third display region 38A set at a front face side of a vehicle cabin illustrated in FIG. 3. The first display region 34A is set in a first display 34, the second display region 36A is set in the second display 36, and the third display region 38A is set in a third display 38. The first display 34, the second display 36, and the third display 38 are each installed in an instrument panel 54 (see FIG. 5).

The third display region 38A of the third display 38 is set at the front face side of the vehicle cabin, at a position closer to the vehicle side section 60C at the side of the driving seat S1 than to a vehicle width direction center position. A picture based on a third image captured by the third camera 22 (the third image capture section 20 (see FIG. 1)) is displayed on the third display region 38A. Moreover, the first display region 34A of the first display 34 and the second display region 36A of the second display 36, these being mutually adjacent to each other, are set at the front face side of the vehicle cabin, further to the front passenger seat S2 side than the vehicle width direction center position. The first display region 34A (see FIG. 7B) is set at a position close to the vehicle side section 60A at the side of the front passenger seat S2, and displays a picture (described in detail later) based on a first image captured by the first camera 14 (the first image capture section 12 (see FIG. 1)). The second display region 36A (see FIG. 7B) is disposed at the vehicle width direction inner side of the first display region 34A so as to lie in a row with the first display region 34A, with a non-display region 35A (see FIG. 7B) therebetween. The second display region 36A displays picture (described in detail later) based on second images captured by the second camera 18 (the second image capture section 16 (see FIG. 1)). Note that the size of the non-display region 35A between the first display region 34A and the second display region 36A is exaggerated in FIG. 3 so as to facilitate understanding of the drawing.

The first display region 34A and the second display region 36A are set such that in plan view of the vehicle, an imaginary straight line L1 passing through an anticipated driver-eye position 62, and a vehicle width direction position 64A corresponding to a terminal position at the vehicle width direction inner side of the front passenger seat S2 at a front end 64 of a vehicle interior ceiling, will pass through a range extending from a vehicle width direction inner end of the first display region 34A of the first display 34 (a first range where picture based on the first image is displayed) to a vehicle width direction outer end of the second display region 36A of the second display 36 (a second range where picture based on the second image is displayed). Note that in plan view of the vehicle, the imaginary straight line L1 is approximated to a straight line passing through the anticipated driver-eye position 62 and the vehicle width direction inner end of a rear-view mirror 68 of a traditional configuration (a mirror provided in the vicinity of a vehicle width direction central portion at the side of the front end 64 of the vehicle interior ceiling).

Figure 5:
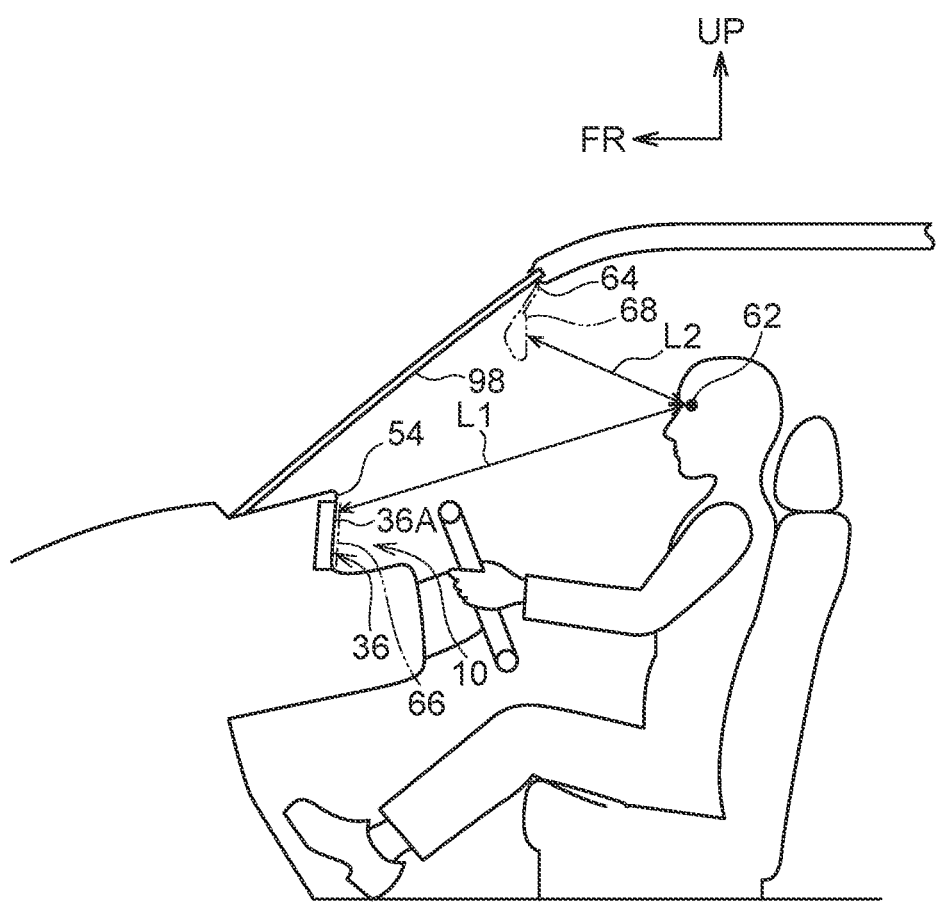
FIG. 5 is a schematic side view illustrating an example of installation positions of displays of an onboard display device according to the first exemplary embodiment.

FIG. 5 is a schematic side view illustrating an example of an installation position of the second display 36 of the onboard display device 10. Note that in FIG. 5, the arrow FR indicates the vehicle front, and the arrow UP indicates the upper side of the vehicle. As illustrated in FIG. 5, a viewing distance (see L1) from the anticipated driver-eye position 62 to the display regions, including the second display region 36A, that are set in the instrument panel 54, is longer than a viewing distance (see L2) from the anticipated driver-eye position 62 to the rear-view mirror 68 of the traditional configuration.

Note that a central display 56 used for car navigation is disposed at a vehicle width direction central portion at the front face side of the vehicle cabin illustrated in FIG. 3. A display region 56A of the central display 56 displays map images and the like.

The display controller 30 connected to the display section 32 illustrated in FIG. 1 is a functional section that performs control relating to picture display on the display section 32 using a control device 40 (see FIG. 2), configured by a computer.

FIG. 2 illustrates a schematic configuration of the control device 40 according to the present exemplary embodiment and external devices connected to the control device 40. As illustrated in FIG. 2, the control device 40 includes a CPU 42, RAM 44, ROM 46, and an input/output interface (I/O) 50, connected to one another through a bus 52. The ROM 46 is a non-volatile storage section, and the ROM 46 is stored with a display control program 48 (an example of a control program of the onboard display device according to the present disclosure). The I/O 50 communicates with an external device. The I/O 50 is connected to the first camera 14, the second camera 18, the third camera 22, the eye tracker 26, the first display 34, the second display 36, the third display 38, and an ignition switch 28. The control device 40 reads the display control program 48 from the ROM 46 and expands the display control program 48 into the RAM 44, and the display control program 48 that has been expanded into the RAM 44 is executed by the CPU 42 such that the control device 40 functions as the display controller 30 (see FIG. 1).

The ignition switch 28 is a switch to start the vehicle and turn power to devices within the vehicle on and off. On/off signals from the ignition switch 28 are input to the control device 40.

Next, as operation of the present exemplary embodiment, explanation follows regarding display control processing executed by the display controller 30 (the control device 40 (see FIG. 2)) in a vehicle installed with the onboard display device 10 illustrated in FIG. 1 and the like, with reference to the flowchart illustrated in FIG. 6. In the present exemplary embodiment, as an example, execution of the display control processing illustrated in FIG. 6 starts when the ignition switch 28 illustrated in FIG. 2 is switched on and inputs a signal to the control device 40 (the display controller 30 (see FIG. 1)). Note that although the display controller 30 illustrated in FIG. 1 also controls the display section 32 illustrated in FIG. 1 so as to display the third image captured by the third image capture section 20 as a picture on the third display region 38A of the third display 38 illustrated in FIG. 3, explanation of this display control processing is omitted in FIG. 6 and in the following explanation.

At step 100 of the display control processing illustrated in FIG. 6, the display controller 30 acquires images of outside the vehicle (rearward-captured images) from the first image capture section 12 and the second image capture section 16, and converts the second image captured by the second image capture section 16 into a point-of-view-converted image viewed as if from a hypothetical point-of-view at the instal-lation position of the first image capture section 12. Moreover, the first image captured by the first image capture section 12 and an image in the point-of-view-converted image in a range not overlapping with that of the first image are stitched together to generate a composite image. Note that various methods are known for processing (point-of-view-conversion processing) to convert an original image into a point-of-view-converted image viewed as if from a hypothetical-point-of-view position other than the point-of-view of from which the image was captured, and so explanation thereof is omitted herein.

Figure 7A:
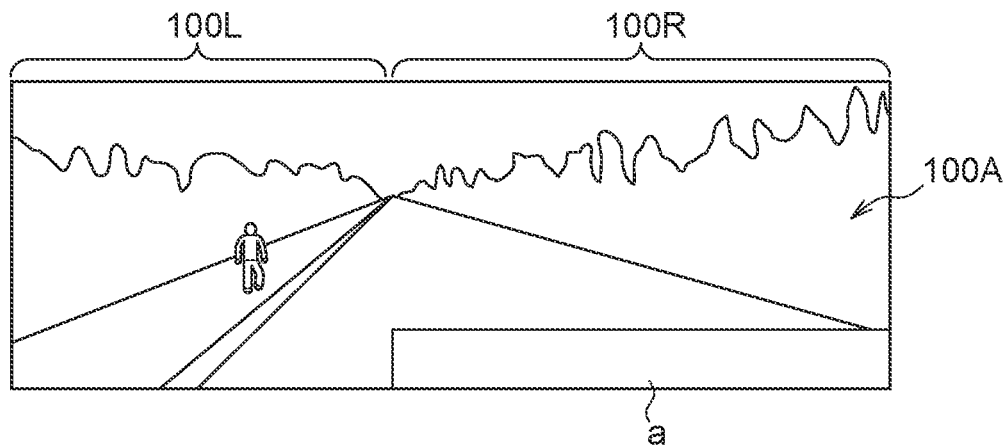
FIG. 7A is an illustration of an example of a composite image.

FIG. 7A illustrates an example of a composite image 100A generated at step 100. In the composite image 100A illustrated in FIG. 7A, a portion based on the first image is formed in a left-right direction range indicated by the reference numeral 100L. A portion of the point-of-view-converted image based on an image in a range not overlapping with that of the first image is formed in a left-right direction range indicated by the reference numeral 100R. Note that the rectangular portion indicated by the reference numeral a at the lower right side of FIG. 7A is an area for which there is no picture external to the vehicle, namely an area corresponding to the vehicle itself and a small blind spot. This area is illustrated in a simplified manner for ease of illustration.

Next, at step 102 illustrated in FIG. 6, the display controller 30 (see FIG. 1) associates the entire region of the composite image 100A with a region combining the first display region 34A, the non-display region 35A, and the second display region 36A. The display controller 30 then extracts from the composite image 100A an image region corresponding to the first display region 34A to generate a first trimmed image, and extracts from the composite image 100A an image region corresponding to the second display region 36A to generate a second trimmed image.

Next, at step 104, the display controller 30 acquires information indicating the visual line direction of the driver from the visual line direction detection section 24. Next, at step 106, the display controller 30 determines whether or not the visual line direction of the driver of the vehicle detected by the visual line direction detection section 24 is directed toward either the first display region 34A or the second display region 36A. The determination of step 106 is determination as to whether or not an intersection point between the gaze of the driver and a plane in which the first display region 34A and the second display region 36A lie is positioned within either the first display region 34A or the second display region 36A. Processing transitions to step 108 when determination is affirmative at step 106, and processing transitions to step 110 when determination is negative at step 106.

Figure 7B:
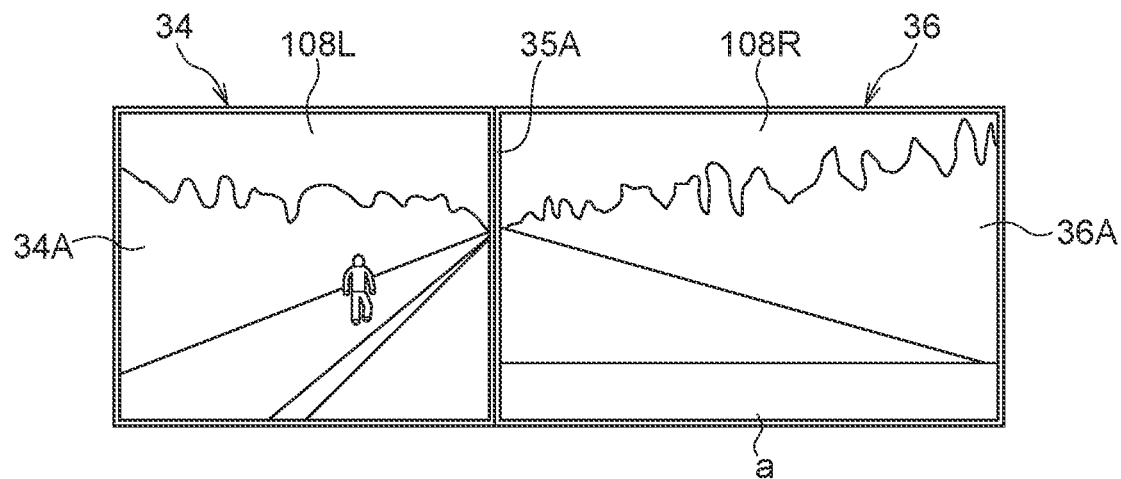
FIG. 7B illustrates an example of picture displayed across the entirety of both a first display region and a second display region.

At step 108, the display controller 30 controls the display section 32 such that the display section 32 displays the first trimmed image as a picture across the entire first display region 34A, and the display section 32 displays the second trimmed image as a picture across the entire second display region 36A. FIG. 7B is an illustration of an example of a picture 108L displayed in the first display region 34A and a picture 108R displayed in the second display region 36A at step 108. As illustrated in FIG. 7B, in the pictures 108L, 108R, a range captured by the second camera 18 (see FIG. 3) (see the second display region 36A) has the appearance of having been captured from the installation position of the first camera 14 (see FIG. 3), thereby improving the ease of viewing the displayed picture. Moreover, the first display region 34A and the second display region 36A are disposed so as to lie in a row, thereby allowing the driver to view the picture 108L in the first display region 34A and the picture 108R in the second display region 36A without a major adjustment in focal distance.

Figure 7C:
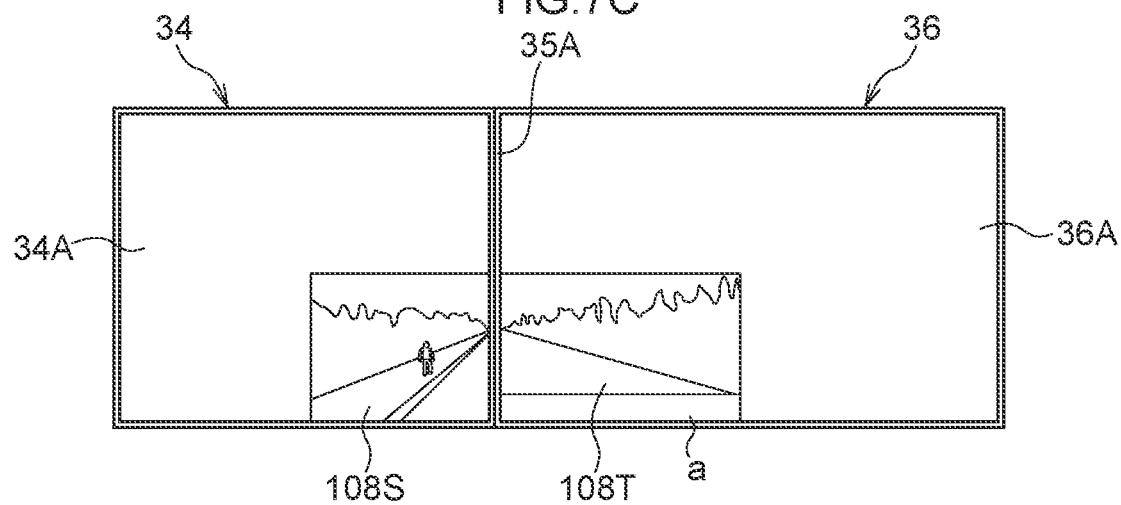
FIG. 7C illustrates an example of picture displayed at a reduced size on partial regions of both a first display region and a second display region.

On the other hand, at step 110 illustrated in FIG. 6, the display controller 30 controls the display section 32 such that the display section 32 displays the first trimmed image as a reduced size picture in a predetermined partial region of the first display region 34A, and the display section 32 displays the second trimmed image as a reduced size picture in a predetermined partial region of the second display region 36A. Accordingly, when the driver is not looking at either the picture in the first display region 34A or the second display region 36A, as illustrated in FIG. 7C, a picture 108S in the first display region 34A and a picture 108T in the second display region 36A can be made less prominent, such that, for example, an occupant sitting in the front passenger seat is not unduly annoyed by the picture 108S in the first display region 34A or the picture 108T in the second display region 36A.

At the next step 112 illustrated in FIG. 6, the display controller 30 determines whether or not the ignition switch (IG) 28 of the vehicle has been turned off. When determination is negative at step 112, processing returns to step 100, and step 100 to step 112 are repeated until determination is affirmative at step 112. When determination is affirmative at step 112, processing transitions to step 114.

At step 114, the display controller 30 determines whether or not a predetermined duration has elapsed since the ignition switch 28 was turned off. When determination is negative at step 114, processing returns to step 100, and step 100 to step 114 are repeated until determination is affirmative at step 114. Accordingly, if less time than the predetermined duration has elapsed since turning off the ignition switch 28, a picture is displayed in the first display region 34A and the second display region 36A for the purpose of checking the rear, enabling the driver to check the rear by looking at the pictures when exiting the vehicle. On the other hand, when determination is affirmative at step 114, the display controller 30 ends the display control processing illustrated in FIG. 6 and turns off display of the pictures.

As described above, the present exemplary embodiment is capable of improving the ease of viewing of the displayed picture. The present exemplary embodiment is also capable of suppressing costs since, as illustrated in FIG. 3, there is no need to provide a large display.

Moreover, in the present exemplary embodiment, the first display region 34A and the second display region 36A are set such that in plan view of the vehicle, the imaginary straight line L1 passing through the anticipated driver-eye position 62, and the vehicle width direction position 64A corresponding to the terminal position at the vehicle width direction inner side of the front passenger seat S2 at the front end 64 of the vehicle interior ceiling, will pass through the range extending from the vehicle width direction inner end of the first display region 34A of the first display 34 (the first range where picture based on the first images is displayed) to the vehicle width direction outer end of the second display region 36A of the second display 36 (the second range where picture based on the second images is displayed). Accordingly, in plan view of the vehicle, when the driver is looking at the second display region 36A of the second display 36, the visual line direction of the driver is substantially equivalent to what the visual line direction of the driver when looking at the rear-view mirror 68 in vehicle plan view, assuming that the rear-view mirror 68 is provided in the vicinity of the vehicle width direction central portion at the side of the front end 64 of the vehicle interior ceiling. This thereby enables the picture in the second display region 36A of the second display 36 to be checked without discomfort.

To explain further using a comparative structure as an example, for example, in a configuration in which images captured rearward of the vehicle are displayed as pictures at the position of the central display 56 at the vehicle width direction central portion of the instrument panel 54, since a gaze angle θ1 of the driver looking at the picture is small, the video configured by the pictures will constantly be in the field of vision of the driver while driving. There is therefore a possibility that the displayed picture could annoy the driver. By contrast, a gaze angle θ2 when the gaze is along the imaginary straight line L1 is rather larger than the gaze angle θ1, and the first display region 34A and the second display region 36A are not at positions that are constantly in the field of vision of the driver while driving. This enables the pictures displayed on the first display region 34A and the second display region 36A to be suppressed from annoying the driver. Note that the "gaze angle" refers to the angle of the gaze of the driver with respect to a reference line LS extending along the vehicle front-rear direction from the position of the eyes of the driver toward the vehicle front in plan view of the vehicle.

Moreover, as illustrated in FIG. 5, the viewing distance from the anticipated driver-eye position 62 to the display regions set in the instrument panel 54, such as the second display region 36A, is longer than the viewing distance from the anticipated driver-eye position 62 to the rear-view mirror 68 of a traditional configuration. Note that in cases in which the rear-view mirror 68 of a traditional configuration is an electronic mirror, when the driver switches from a state looking ahead of the vehicle to look at picture on the rear-view mirror 68 (electronic mirror), the short viewing distance makes it difficult to for the driver to adjust their focus. By contrast, in the configuration of the present exemplary embodiment, when the driver switches from a state looking ahead of the vehicle to look at the picture in the display regions such as the second display region 36A set in the instrument panel 54, it is easier for the driver to adjust their focus.

To elaborate, unlike optical mirrors, with electronic mirrors it is necessary to focus on a display screen, and therefore the short distance from the eyes of the driver to the display screen makes it difficult to adjust focus. However, in the present exemplary embodiment, a longer distance from the eyes to the display screen is secured, making it easier for the driver to adjust their focus than in cases in which the rear-view mirror 68 is configured by an electronic mirror.

As illustrated in FIG. 3, in the present exemplary embodiment, the second display 36 is disposed at a position offset from the vehicle width direction central portion. This thereby enables provision of both the central display 56 that is disposed at the vehicle width direction central portion and that is used for car navigation, and the second display 36 that displays a picture of a central region behind the vehicle.

As described above, the present exemplary embodiment enables stress-free viewing of electronic information distributed around the vehicle cabin interior.

Modified Example of the First Exemplary Embodiment

In the first exemplary embodiment described above, the display control processing illustrated in FIG. 6 and executed by the display controller 30 (control device 40 (see FIG. 2)) illustrated in FIG. 1 includes step 104 to step 110. However, the display control processing may be configured such that step 108 is executed instead of step 104 to step 110.

Moreover, in cases in which a configuration is adopted in which step 108 is executed instead of step 104 to step 110 of the display control processing illustrated in FIG. 6, configuration may be made in which a light control film 66 that makes the picture in the first display region 34A and the second display region 36A visible only from the driving seat S1 side is placed over the surfaces of both the first display region 34A and the second display region 36A illustrated in FIG. 3. The light control film 66 is configured with plural light diffusion-limiting louvres that are inclined toward the driving seat S1 side on progression toward the vehicle rear. In a modified example in which the light control film 66 is provided in this manner, the picture in the first display region 34A and the second display region 36A is visible only from the driving seat S1 side as a result of the light control film 66 being placed over the surface of both the first display region 34A and the second display region 36A. Accordingly, the pictures in the first display region 34A and the second display region 36A can be prevented from entering the field of vision of an occupant of the front passenger seat S2, such that the occupant of the front passenger seat S2 is not annoyed by the respective pictures being displayed in the first display region 34A and the second display region 36A.

In the first exemplary embodiment described above, the display control processing illustrated in FIG. 6 and executed by the display controller 30 (control device 40 (see FIG. 2)) illustrated in FIG. 1 includes step 110. However, in cases in which, for example, a door mirror or the like is also provided, the display control processing may be configured such that instead of step 110 illustrated in FIG. 6, a step is executed to switch off display of (namely, to not display) the picture of the first trimmed images and the second trimmed images.

As another modified example, a detection device may be provided to detect whether or not the driver has exited the vehicle, and instead of steps 112 and 114 in FIG. 6, an exit determination step may be provided in which determination is made as to whether or not the driver has exited the vehicle. When determination is negative at this exit determination step, processing returns to step 100, and step 100 to the exit determination step are repeated until determination is affirmative at the exit determination step. When determination is affirmative at the exit determination step, the display controller (30) ends the display control processing.

Second Exemplary Embodiment

Figure 8:
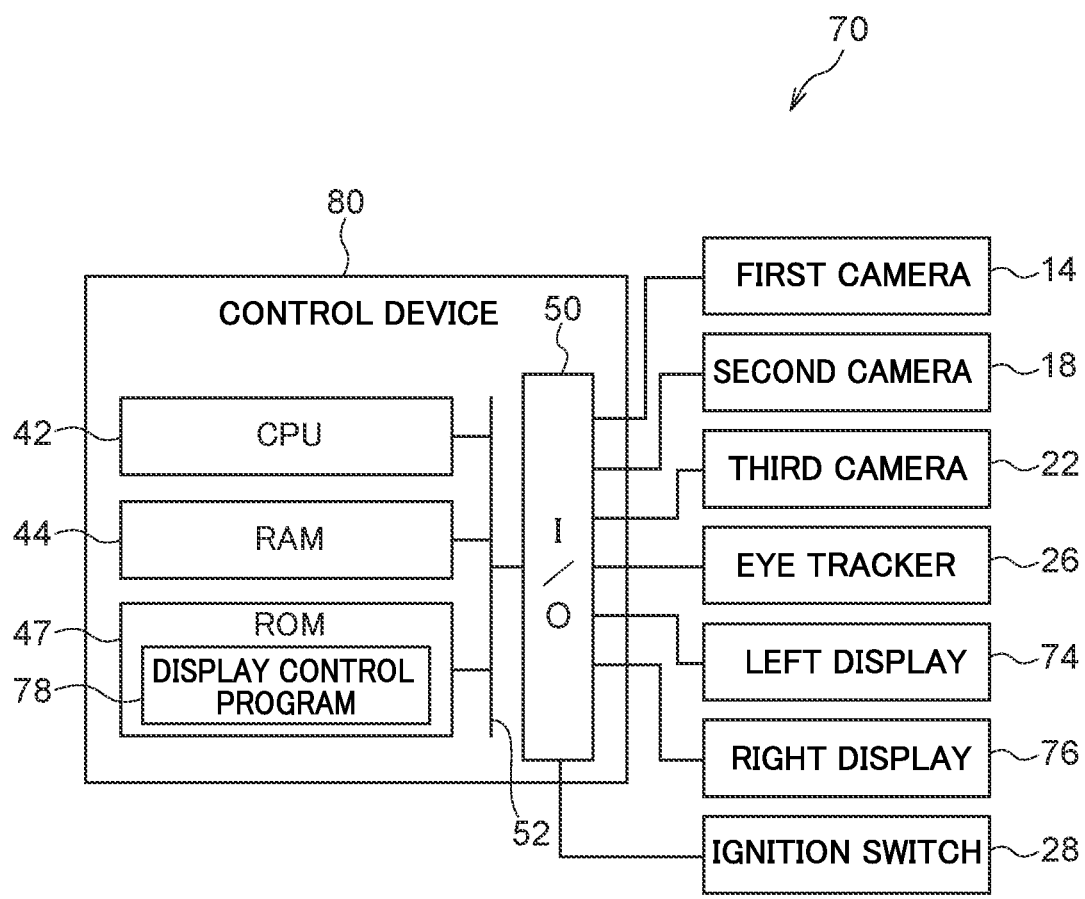
FIG. 8 is a block diagram illustrating an example of a schematic configuration of a control device and of an external device connected to the control device in an onboard display device according to a second exemplary embodiment.
Figure 9:
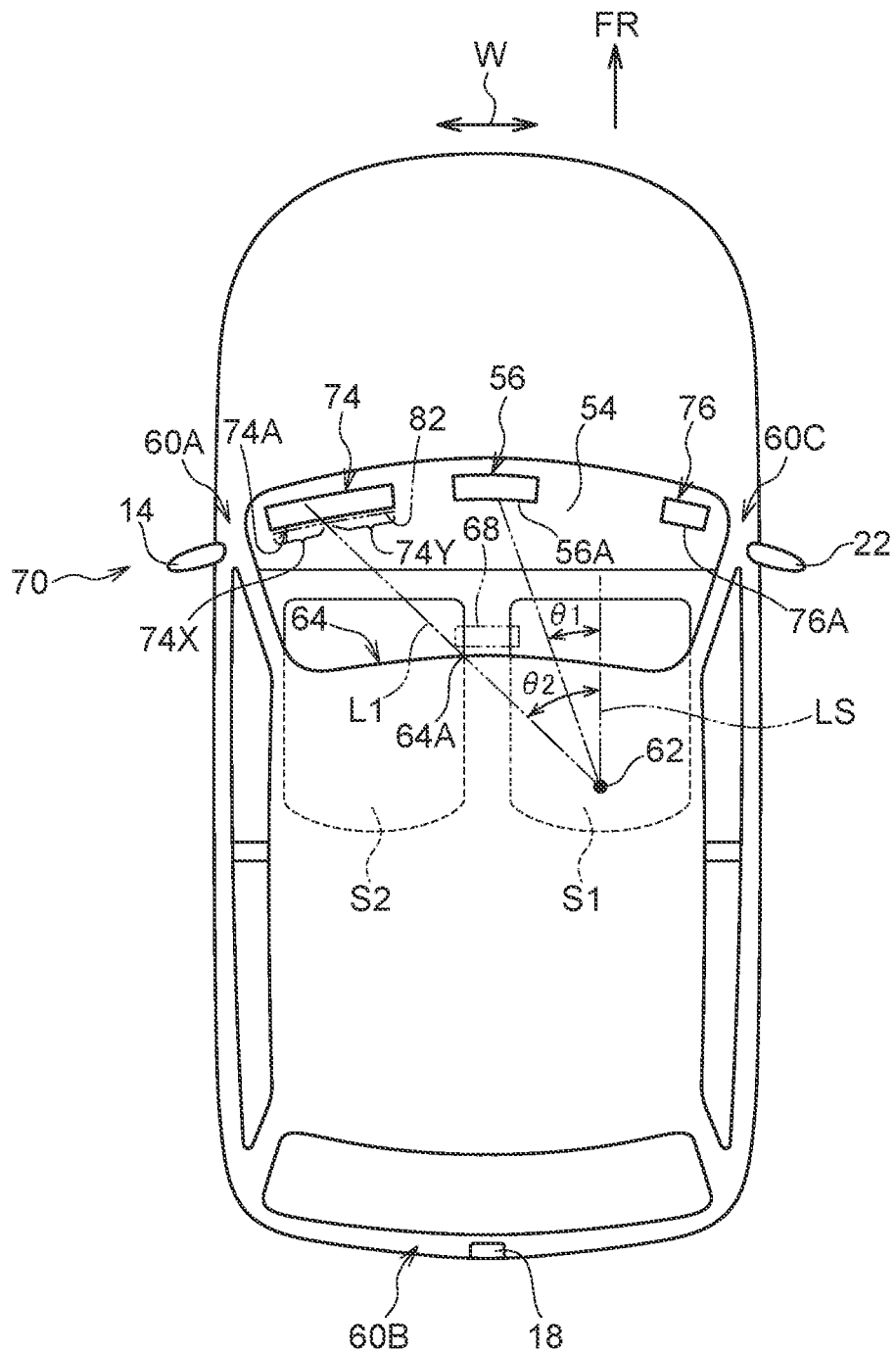
FIG. 9 is a schematic plan view illustrating an example of installation positions of displays and the like in an onboard display device according to the second exemplary embodiment.
Figure 10:
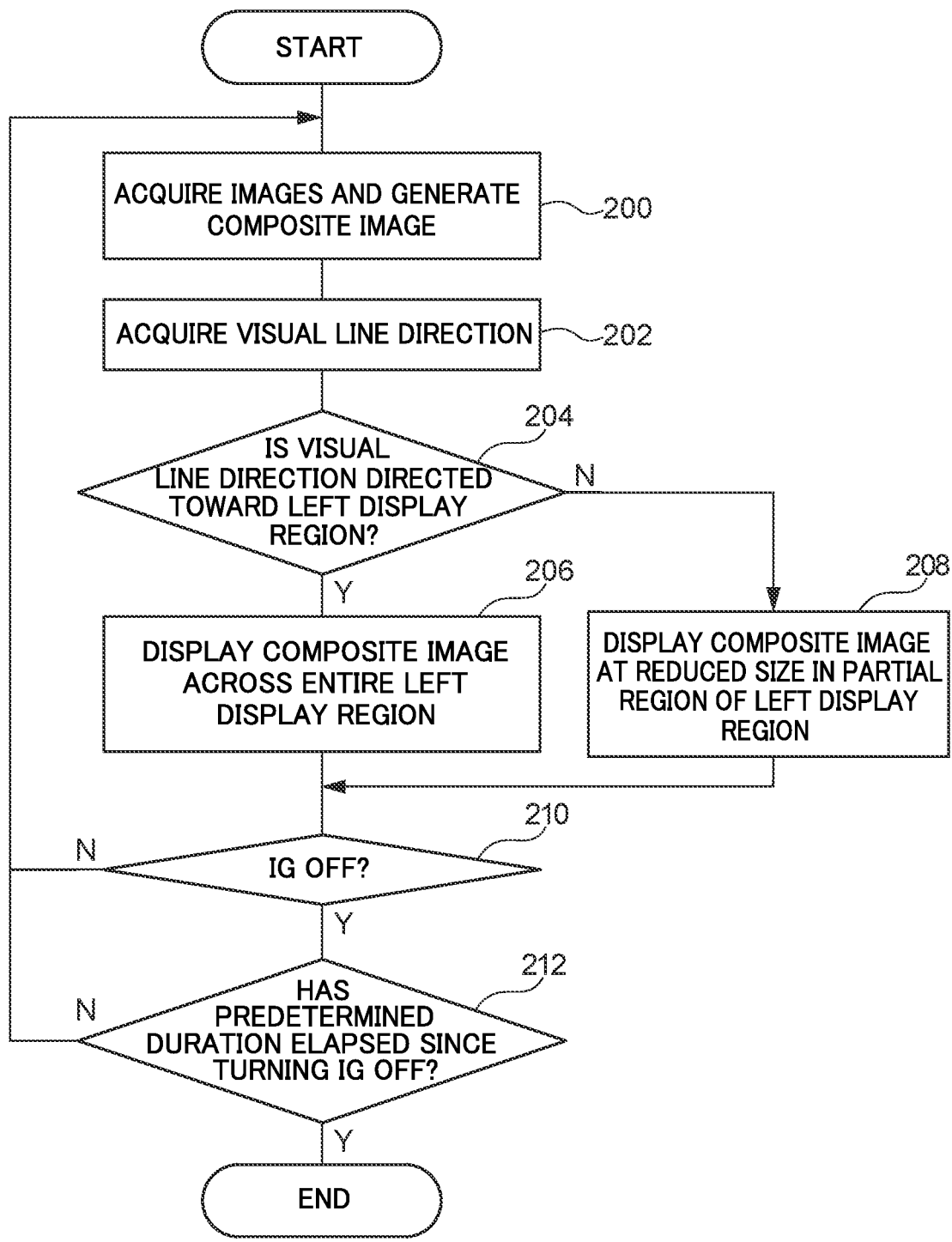
FIG. 10 is a flowchart illustrating an example of a flow of processing executed by a control device of an onboard display device according to the second exemplary embodiment.

Next, explanation follows regarding a second exemplary embodiment of the present disclosure, with reference to FIG. 8 to FIG. 10 and also referring back to FIG. 1 to FIG. 7A. FIG. 8 is a block diagram (a diagram corresponding to FIG. 2 of the first exemplary embodiment) illustrating schematic configuration of a control device 80 of an onboard display device 70 according to the present exemplary embodiment, and external devices connected to the control device 80. FIG. 9 is a schematic plan view (a diagram corresponding to FIG. 3 of the first exemplary embodiment) illustrating installation positions of displays and the like of the onboard display device 70 according to the present exemplary embodiment. FIG. 10 is a flowchart (a diagram corresponding to FIG. 6 of the first exemplary embodiment) illustrating a flow of processing executed by the control device 80 of the onboard display device 70 according to the present exemplary embodiment.

Similarly to the onboard display device 10 of the first exemplary embodiment (see FIG. 1, etc.), the onboard display device 70 is installed onboard a vehicle, and is a device that displays pictures based on images captured rearward of the vehicle in order to assist a driver with driving the vehicle. Referring back to FIG. 1, in the present exemplary embodiment, the first image capture section 12, the second image capture section 16, the third image capture section 20, and the visual line direction detection section 24 are configured similarly to in the first exemplary embodiment. Moreover, in the present exemplary embodiment, although specific configurations of the display controller 30 and the display section 32 differ from those of the first exemplary embodiment they are allocated the same reference numerals as in the first exemplary embodiment for ease of explanation, since the configuration of connections to other functional blocks is the same as in FIG. 1. Hereafter in the description of the present exemplary embodiment, reference to the display controller 30 and the display section 32 refers not to the display controller 30 and the display section 32 of the first exemplary embodiment, but to the display controller 30 and the display section 32 of the present exemplary embodiment. Note that with the exception of the points described below, the present exemplary embodiment has substantially the same configuration as that of the first exemplary embodiment. Configuration sections substantially the same as those of the first exemplary embodiment are thus allocated the same reference numerals, and explanation thereof is omitted.

As illustrated in FIG. 8 and FIG. 9, in the present exemplary embodiment, the left display 74 illustrated in FIG. 8 and FIG. 9 is provided instead of the first display 34 and the second display 36 of the first exemplary embodiment illustrated in FIG. 2 and FIG. 3. Note that although a right display 76 of the present exemplary embodiment has a different name and reference numeral to the third display 38 of the first exemplary embodiment illustrated in FIG. 2 and FIG. 3, the right display 76 is a configuration section similar to the third display 38. As illustrated in FIG. 9, the left display 74 includes a left display region 74A, and the right display 76 includes a right display region 76A.

In the present exemplary embodiment, the display section 32 (see FIG. 1) includes the left display 74 and the right display 76 illustrated in FIG. 8 and FIG. 9, and is a functional section capable of displaying pictures on the left display region 74A and the right display region 76A set at the front face side of the vehicle cabin illustrated in FIG. 9.

As illustrated in FIG. 9, the right display region 76A of the right display 76 is set at a similar position to the third display region 38A of the third display 38 of the first exemplary embodiment illustrated in FIG. 3. On the other hand, the left display region 74A of the left display 74 illustrated in FIG. 9 is set in a range corresponding to the combined regions of the first display region 34A, the non-display region 35A, and the second display region 36A of the first exemplary embodiment illustrated in FIG. 3. Namely, the left display region 74A of the left display 74 illustrated in FIG. 9 configures a display region set at the front face side of the vehicle cabin, further to the front passenger seat S2 side than the vehicle width direction center position.

The left display region 74A is set such that in vehicle plan view, the imaginary straight line L1, passing through the anticipated driver-eye position 62 and the vehicle width direction position 64A corresponding to the terminal position at the vehicle width direction inner side of the front passenger seat S2 at the front end 64 of the vehicle interior ceiling, will pass through a range extending from a vehicle width direction inner end of a first range 74X displaying a picture based on a first image captured by the first camera 14 (the first image capture section 12 (see FIG. 1)) to a vehicle width direction outer end of a second range 74Y displaying a picture based on a second image captured by the second camera 18 (the second image capture section 16 (see FIG. 1)).

Moreover, in the present exemplary embodiment, the display controller 30 (see FIG. 1) is a functional section that controls picture display by the display section 32 (see FIG. 1) using the control device 80, serving as a computer, illustrated in FIG. 8.

As illustrated in FIG. 8, instead of the ROM 46 (see FIG. 2) of the first exemplary embodiment, the control device 80 includes ROM 47 stored with a display control program 78 (an example of a control program of an onboard display device according to the present disclosure). Note that the ROM 47 is a non-volatile storage section similar to the ROM 46 (see FIG. 2) of the first exemplary embodiment. Moreover, the I/O 50 of the control device 80 is connected to the first camera 14, the second camera 18, the third camera 22, the eye tracker 26, the left display 74, the right display 76, and the ignition switch 28. With the exception of these points, the control device 80 is otherwise similar to the control device 40 (see FIG. 2) of the first exemplary embodiment. The control device 80 reads the display control program 78 from the ROM 47 and expands the display control program 78 into the RAM 44, and the display control program 78 expanded into the RAM 44 is executed by the CPU 42 such that the control device 80 functions as the display controller 30 (see FIG. 1) of the present exemplary embodiment.

Next, as operation of the present exemplary embodiment, explanation follows regarding display control processing executed by the display controller 30 (see FIG. 1, the control device 80) in a vehicle installed with the onboard display device 70 illustrated in FIG. 8 and the like, with reference to the flowchart illustrated in FIG. 10. In the present exemplary embodiment, as an example, execution of the display control processing illustrated in FIG. 10 starts when the ignition switch 28 illustrated in FIG. 8 is switched on and inputs a signal to the control device 80 (the display controller 30 (see FIG. 1)). Note that the display controller 30 (see FIG. 1, the control device 80) controls the display section 32 (see FIG. 1) so as to display a third image captured by the third image capture section 20 (see FIG. 1) as a picture in the right display region 76A of the right display 76 illustrated in FIG. 9. However, explanation of this display control processing is omitted in FIG. 10 and the following explanation.

At step 200 of the display control processing illustrated in FIG. 10, the display controller 30 acquires images of outside the vehicle (rearward-captured images) from the first image capture section 12 and the second image capture section 16, and then converts the second image captured by the second image capture section 16 into a point-of-view-converted image as if from a hypothetical point-of-view at the installation position of the first image capture section 12. Moreover, the first image captured by the first image capture section 12 and an image in the point-of-view-converted image in a range not overlapping with that of the first images are stitched together to generate a composite image 100A (see FIG. 7A).

Next, at step 202, the display controller 30 acquires information indicating the visual line direction of the driver from the visual line direction detection section 24. Next, at step 204, the display controller 30 determines whether or not the visual line direction of the driver of the vehicle detected by the visual line direction detection section 24 is directed toward the left display region 74A. The determination of step 204 is determination as to whether or not an intersection point between the gaze of the driver and a plane in which the left display region 74A lies is positioned within the left display region 74A. Processing transitions to step 206 when determination is affirmative at step 204, and processing transitions to step 208 when determination is negative at step 204.

At step 206, the display controller 30 controls the display section 32 such that the display section 32 displays the composite image 100A (see FIG. 7A) as picture across the entire left display region 74A. Accordingly, a range imaged by the second image capture section 16 has the appearance of having been captured from the installation position of the first image capture section 12, thereby improving the ease of viewing of the displayed picture. Moreover, the range captured by the first image capture section 12 and the range captured by the second image capture section 16 are displayed continuously to one another on the left display region 74A, thereby allowing the driver to view the respective pictures of the range captured by the first image capture section 12 and the range captured by the second image capture section 16 without a major adjustment of focal distance.

On the other hand, at step 208, the display controller 30 controls the display section 32 such that the display section 32 displays the composite image 100A (see FIG. 7A) as a reduced sized picture in a predetermined partial region of the left display region 74A. Accordingly, when the driver is not looking at the picture in the left display region 74A, the picture in the left display region 74A can be made less prominent, such that, for example, an occupant sitting in the front passenger seat is not unduly annoyed by the picture in the left display region 74A.

At the next step 210, the display controller 30 determines whether or not the ignition switch (IG) 28 of the vehicle has been turned off. When determination is negative at step 210, processing returns to step 200, and step 200 to step 210 are repeated until determination is affirmative at step 210. When determination is affirmative at step 210, processing transitions to step 212.

At step 212, the display controller 30 determines whether or not a predetermined duration has elapsed since the ignition switch 28 was turned off. When determination is negative at step 212, processing returns to step 200, and step 200 to step 212 are repeated until determination is affirmative at step 212. Accordingly, if less than the predetermined duration has elapsed since turning off the ignition switch 28, a picture is displayed in the left display region 74A for the purpose of checking the rear, enabling the driver to check the rear by looking at the picture when exiting the vehicle. On the other hand, when determination is affirmative at step 212, the display controller 30 ends the display control processing illustrated in FIG. 10 and turns off display of the picture.

As described above, the present exemplary embodiment is capable of improving the ease of viewing the displayed picture.

Moreover, as illustrated in FIG. 9, in the present exemplary embodiment, the left display region 74A is set such that in plan view of the vehicle, the imaginary straight line L1, passing through the anticipated driver-eye position 62 and the vehicle width direction position 64A corresponding to the terminal position at the vehicle width direction inner side of the front passenger seat S2 at the front end 64 of the vehicle interior ceiling, will pass through a range extending from the vehicle width direction inner end of the first range 74X displaying picture based on the first images captured by the first camera 14 (the first image capture section 12 (see FIG. 1)) to the vehicle width direction outer end of the second range 74Y displaying picture based on the second images captured by the second camera 18 (the second image capture section 16 (see FIG. 1)). Accordingly, in plan view of the vehicle, when the driver is looking at the second range 74Y displaying a picture based on the second image in the left display region 74A of the left display 74, the visual line direction of the driver is substantially the same as the visual line direction of the driver when looking at the rear-view mirror 68 in plan view of the vehicle, assuming that the rear-view mirror 68 is provided in the vicinity of the vehicle width direction central portion at the side of the front end 64 of the vehicle interior ceiling. This thereby enables the picture being displayed in the second range 74Y of the left display region 74A of the left display 74 to be checked without discomfort.

Moreover, in the present exemplary embodiment, the left display 74 is disposed at a position offset from the vehicle width direction central portion. This thereby enables provision of both the central display 56 that is disposed at the vehicle width direction central portion and that is used for car navigation, and the left display 74 that displays pictures of a central region to the rear of the vehicle in part of a display region (specifically, in the second range 74Y of the left display region 74A).

Modified Example of the Second Exemplary Embodiment

In the second exemplary embodiment described above, the display control processing illustrated in FIG. 10 and executed by the display controller 30 (see FIG. 1, the control device 80 (see FIG. 8)) includes step 202 to step 208 illustrated in FIG. 10. However, the display control processing may be configured such that step 206 is executed instead of step 202 to step 208.

Moreover, in cases in which a configuration is adopted in which step 206 is executed instead of step 202 to step 208 in the display control processing illustrated in FIG. 10, configuration may be made in which a light control film 82 that makes the picture in the left display region 74A visible only from the driving seat 51 side is placed over the surface of the left display region 74A illustrated in FIG. 9. The light control film 82 is configured with plural light diffusion-limiting louvres that are inclined toward the driving seat 51 side on progression toward the vehicle rear. In a modified example in which the light control film 82 is provided in this manner, the picture in the left display region 74A is visible only from the driving seat 51 side as a result of the light control film 82 being placed over the surface of left display region 74A. Accordingly, the picture in the left display region 74A can be prevented from entering the field of vision of an occupant of the front passenger seat S2, such that the occupant of the front passenger seat S2 is not annoyed by the picture being displayed in the left display region 74A.

Moreover, in the second exemplary embodiment described above, the display control processing illustrated in FIG. 10 and executed by the display controller 30 (see FIG. 1, the control device 80 (see FIG. 8)) includes step 208. However, in cases in which, for example, a door mirror or the like is also provided, the display control processing may be configured such that instead of step 208 illustrated in FIG. 10, a step is executed to switch off display of (namely, to not display) the picture of the composite image 100A (see FIG. 7A).

As another modified example, a detection device may be provided to detect whether or not the driver has exited the vehicle, and instead of steps 210, 212 in FIG. 10, an exit determination step may be provided in which determination is made as to whether or not the driver has exited the vehicle. When determination is negative at this exit determination step, processing returns to step 200, and step 200 to the exit determination step are repeated until determination is affirmative at the exit determination step. When determination is affirmative at the exit determination step, the display controller (30) ends the display control processing.

Third Exemplary Embodiment

Figure 11A:
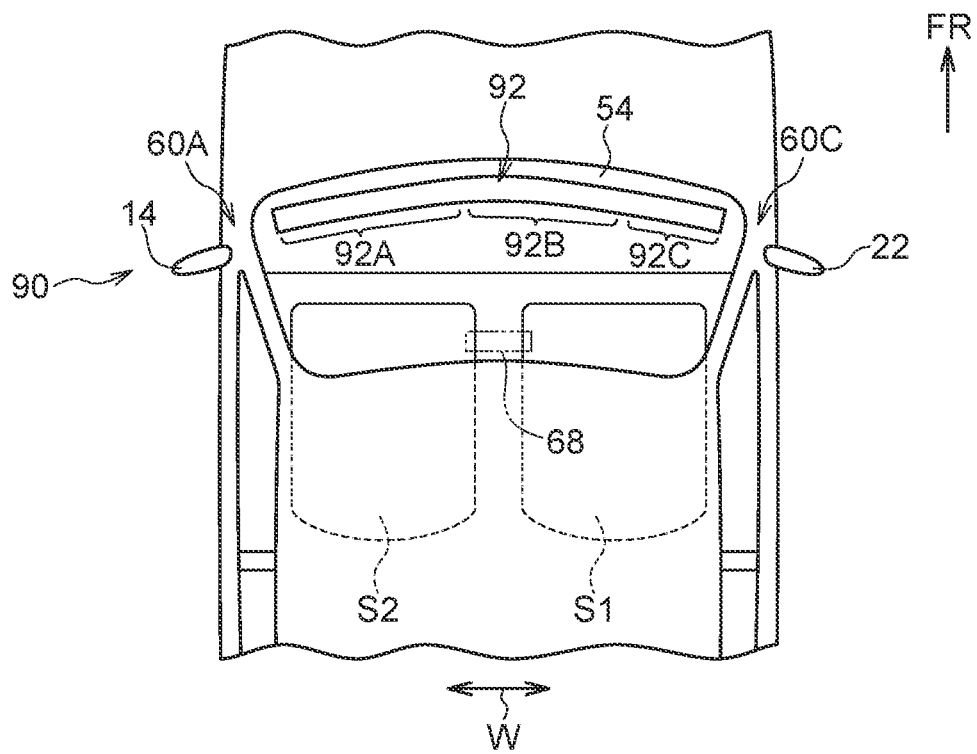
FIG. 11A is a schematic plan view illustrating an example of installation positions of displays and the like in an onboard display device according to a third exemplary embodiment.

Next, explanation follows regarding a third exemplary embodiment of the present disclosure, with reference to FIG. 11A. FIG. 11A is a schematic plan view illustrating installation positions of a display 92 and the like of an onboard display device 90 according to the present exemplary embodiment. As illustrated in FIG. 11A, the present exemplary embodiment differs from the second exemplary embodiment in the point that a large display 92 illustrated in FIG. 11A and incorporating the left display 74, the central display 56, and the right display 76 is provided instead of the left display 74, the central display 56, and the right display 76 illustrated in FIG. 9.

Note that the present exemplary embodiment has substantially the same configuration as the second exemplary embodiment, with the exception of the points explained below. Accordingly, configuration sections that are substantially the same as those of the second exemplary embodiment are allocated the same reference numerals, and explanation thereof is omitted.

The display 92 is configured by a left display region 92A corresponding to the left display region 74A of the second exemplary embodiment (see FIG. 9), a central display region 92B corresponding to the display region 56A on the central side in the second exemplary embodiment (see FIG. 9), and a right display region 92C corresponding to the right display region 76A of the second exemplary embodiment (see FIG. 9), disposed adjacently to one another.

The configuration of the present exemplary embodiment again enables ease of viewing of the displayed picture to be improved.

Note that as a modified example of the third exemplary embodiment, configuration may be made such that in specific situations in which a shift range has not been set to a reverse range, an image captured by the third camera 22 is displayed as a picture on the right display region 92C, and an image captured by the third camera 22 is displayed as a picture on the central display region 92B instead of a car navigation picture when the shift range has been set to the reverse range (for example, so as to be adjacent to the left display region 92A). Moreover, as another modified example of the third exemplary embodiment, configuration may be made such that in specific situations in which a shift range has not been set to the reverse range, the composite image 100A (see FIG. 7A) is displayed as a picture in the left display region 92A, and the composite image 100A (see FIG. 7A) is, for example, reduced to a size that fits into the central display region 92B and displayed as a picture in the central display region 92B instead of a car navigation picture when the shift range has been set to the reverse range.

Fourth Exemplary Embodiment

Figure 11B:
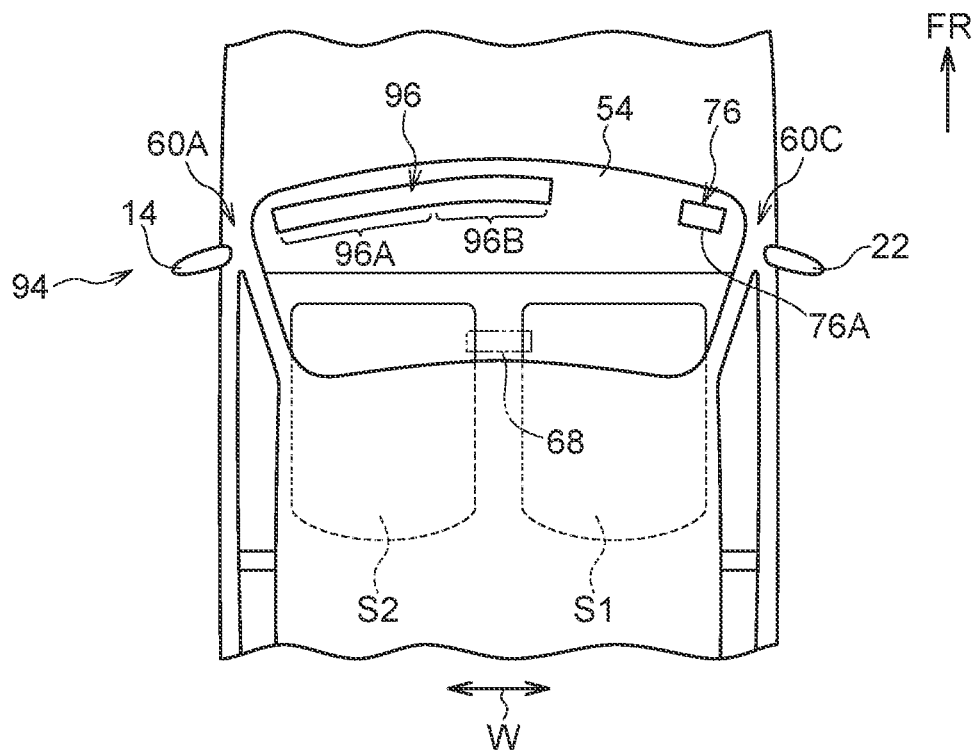
FIG. 11B is a schematic plan view illustrating an example of installation positions of displays and the like in an onboard display device according to a fourth exemplary embodiment.

Next, explanation follows regarding a fourth exemplary embodiment of the present disclosure, with reference to FIG. 11B. FIG. 11B is a schematic plan view illustrating installation positions of a display and the like of an onboard display device 94 according to the present exemplary embodiment. As illustrated in FIG. 11B, the present exemplary embodiment differs from the second exemplary embodiment in the point that a display 96 illustrated in FIG. 11B that incorporates both the left display 74 and the central display 56 is provided instead of the left display 74 and the central display 56 illustrated in FIG. 9.

Note that the present exemplary embodiment has substantially the same configuration as the second exemplary embodiment, with the exception of the points explained below. Accordingly, configuration sections that are substantially the same as those of the second exemplary embodiment are allocated the same reference numerals, and explanation thereof is omitted.

The display 96 is configured by a left display region 96A corresponding to the left display region 74A of the second exemplary embodiment (see FIG. 9) and a central display region 96B corresponding to the display region 56A on the central side in the second exemplary embodiment (see FIG. 9), disposed adjacently to one another.

The configuration of the present exemplary embodiment again obtains similar operation and advantageous effects to those of the second exemplary embodiment described above.

Note that as a modified example of the fourth exemplary embodiment, configuration may be made such that in specific situations in which a shift range has not been set to a reverse range, an image captured by the third camera 22 is displayed as a picture on the right display region 76A, and an image captured by the third camera 22 is displayed as a picture on the central display region 96B instead of a car navigation picture when the shift range has been set to the reverse range. Moreover, as another modified example of the fourth exemplary embodiment, configuration may be made such that in specific situations in which a shift range has not been set to the reverse range, the composite image 100A (see FIG. 7A) is displayed as a picture on the left display region 96A, and the composite image 100A (see FIG. 7A) is, for example, reduced to a size that fits into the central display region 96B and displayed as a picture in the central display region 96B instead of a car navigation picture when the shift range has been set to the reverse range.

The configuration of the present exemplary embodiment again enables ease of viewing of the displayed picture to be improved.

Supplementary Explanation of the Exemplary Embodiments

Note that as a modified example of the exemplary embodiments described above, the display section may, for example, be configured by a display section capable of displaying pictures in display regions other than display regions of a display set in the instrument panel 54 at the front face side of the vehicle cabin. For example, the display section may be configured by a head-up display, capable of displaying a picture in a display region on a front windshield 98 (see FIG. 5) at the front face side of the vehicle cabin.

Moreover, as a modified example of the exemplary embodiments described above, the first image capture section may be disposed at a location other than a position where a normal door mirror is provided at a vehicle side section (60A) of a front passenger seat (S2), and the second image capture section may be disposed at a location other than a position above the number plate at a vehicle rear end section (60B).

Moreover, in the display region of the display section, the setting positions of the first range that displays picture based on the first images and the second range that displays picture based on the second images are not limited to the examples described in the first and second exemplary embodiments.

Moreover, the display control program 48 illustrated in FIG. 2 and the display control program 78 illustrated in FIG. 8 may be stored and distributed using a non-transitory storage medium or the like.

Note that the exemplary embodiments described above and the modified examples described above may be implemented in appropriate combinations with each other.

Explanation has been given regarding examples of the present disclosure. However, the present disclosure is not limited to the above, and obviously various other modifications may be implemented within a range not departing from the spirit of the present disclosure.

Note that as a reference example not provided in the exemplary embodiments of the present disclosure, a camera configuring an image capture section may be disposed on an upper face of the vehicle roof so as to be capable of capturing images around a full 360° range, and configuration may be made such that the display section displays images captured by this camera in a display region at the front face side of the vehicle cabin.

An onboard display device of a first aspect includes a display section, a first image capture section, a second image capture section, and a display controller. The display section includes a display region set on a front passenger seat side of a vehicle width direction center position at a front face side of a vehicle cabin, and is capable of displaying a picture in the display region. The first image capture section is disposed at a vehicle side section on the front passenger seat side and captures images of a vehicle rearward. The second image capture section is disposed at a vehicle rear end section, and captures images of the vehicle rearward in an imaging range partially overlapping with an imaging range of the first image capture section. The display controller converts a second image captured by the second image capture section to a point-of-view-converted image viewed as if from a hypothetical point-of-view at an installation position of the first image capture section, and stitches (or combines) a first image captured by the first image capture section together with an image from a range in the point-of-view-converted image not overlapping with the first image to generate a composite image. The display controller then controls the display section so as to display the composite image in the display region as the picture.

According to the above configuration, the display section is capable of displaying a picture in the display region set on the front passenger seat side of the vehicle width direction center position at the front face side of the vehicle cabin. The first image capture section disposed at the vehicle side section on the front passenger seat side captures images of the vehicle rearward, and the second image capture section disposed at the vehicle rear end section captures images of the vehicle rearward in an imaging range partially overlapping with the imaging range of the first image capture section.

The display controller converts the second image captured by the second image capture section to a point-of-viewconverted image viewed as if from a hypothetical point-of-view at the installation position of the first image capture section, and stitches the first image captured by the first image capture section together with the image from a range in the point-of-view-converted image that does not overlap with the first image, thereby generating the composite image. The display controller then controls the display section so as to display the composite image in the display region as the picture. Accordingly, the range captured by the second image capture section has the appearance of having been captured from the installation position of the first image capture section, thereby improving the ease of viewing of the displayed picture.

An onboard display device of a second aspect includes a display section, a first image capture section, a second image capture section, and a display controller. The display section includes a display region set on a front passenger seat side of a vehicle width direction center position at a front face side of a vehicle cabin, and that is capable of displaying a picture in the display region. The display region includes a first display region and a second display region disposed at a vehicle width direction inner side of the first display region so as to lie in a row with the first display region with a non-display region therebetween. The first image capture section is disposed at a vehicle side section on the front passenger seat side and captures images of a vehicle rearward. The second image capture section is disposed at a vehicle rear end section, and captures images of the vehicle rearward in an imaging range partially overlapping with an imaging range of the first image capture section. The display controller converts a second image captured by the second image capture section to a point-of-view-converted image viewed as if from a hypothetical point-of-view at an installation position of the first image capture section, and stitches a first image captured by the first image capture section together with an image from a range in the point-of-view-converted image not overlapping with the first image to generate a composite image. The display controller also associates an overall region of the composite image with a region combining the first display region, the non-display region, and the second display region, and extracts from the composite image an image region corresponding to the first display region to generate a first trimmed image and extracts from the composite image an image region corresponding to the second display region to generate a second trimmed image. The display controller then controls the display section so as to display the first trimmed image in the first display region as the picture, and controls the display section so as to display the second trimmed image in the second display region as the picture.

According to the above configuration, the display section is capable of displaying a picture in both the first display region and the second display region set on the front passenger seat side of the vehicle width direction center position at the front face side of the vehicle cabin. The second display region is disposed at the vehicle width direction inner side of the first display region so as to lie in a row with the first display region, with the non-display region therebetween. The first image capture section disposed at the vehicle side section on the front passenger seat side captures images of the vehicle rearward, and the second image capture section disposed at the vehicle rear end section captures images of the vehicle rearward in an imaging range that partially overlapping with the imaging range of the first image capture section.

The display controller converts the second image captured by the second image capture section to the point-of-view-converted image viewed as if from a hypothetical point-of-view at the installation position of the first image capture section, and stitches the first image captured by the first image capture section together with the image from a range in the point-of-view-converted image that does not overlap with the first image, thereby generating the composite image. The display controller then associates the overall region of the composite image with the region combining the first display region, the non-display region, and the second display region, and extracts, from the composite image, the image region corresponding to the first display region, thereby generating the first trimmed image. The display controller also extracts, from the composite image, the image region corresponding to the second display region, thereby generating the second trimmed image. The display controller then controls the display section so as to display the first trimmed image in the first display region as the picture, and controls the display section so as to display the second trimmed image in the second display region as the picture. The range captured by the second image capture section has the appearance of having been captured from the installation position of the first image capture section, thereby improving the ease of viewing of the displayed picture.

An onboard display device of a third aspect is the configuration of the first aspect or the second aspect, wherein the display region is set such that in vehicle plan view an imaginary straight line passing through an anticipated driver-eye position and a vehicle width direction position corresponding to a terminal position at the vehicle width direction inner side of the front passenger seat at a front end of a vehicle interior ceiling will pass through a range extending from a vehicle width direction inner end of a first range where the picture based on the first image is displayed to a vehicle width direction outer end of a second range where the picture based on the second image is displayed.

Note that in the third aspect, the "anticipated driver-eye position" refers to a position where the point-of-view of the driver may be expected to be when a driver of a standard build for the country in which the onboard display device of the present disclosure is being used is seated on a driving seat at a standard sitting position and with a standard sitting posture for driving.

According to the configuration described above, in vehicle plan view, the visual line direction of the driver when looking at the second range displaying the picture based on the second image is substantially the same as the visual line direction of the driver in plan view of the vehicle when looking at a rear-view mirror, assuming that the rear-view mirror is provided in the vicinity of a vehicle width direction central portion at the front end side of the vehicle interior ceiling. This thereby enables the picture displayed based on the second image to be checked without discomfort.

An onboard display device of a fourth aspect is the configuration of any one of the first aspect to the third aspect, wherein a light control film to make the picture in the display region visible only from a driving seat side is placed over a surface of the display region.

According to the above configuration, due to the light control film being placed over the surface of the display region, the picture in the display region is only visible from the driving seat side. This thereby enables the picture in the display region to be prevented from entering the field of vision of an occupant of the front passenger seat, such that the occupant of the front passenger seat is not annoyed by the picture in the display region.

An onboard display device of a fifth aspect is the configuration of any one of the first aspect to the fourth aspect, further including a visual line direction detection section. The visual line direction detection section detects a visual line direction of a driver of the vehicle. Moreover, the display controller controls the display section so as to display the picture across the entirety of the display region in cases in which a visual line direction of the driver of the vehicle detected by the visual line direction detection section is directed toward the display region, and controls the display section so as to display the picture at reduced size in a predetermined partial region of the display region in cases other than cases in which the visual line direction of the driver of the vehicle detected by the visual line direction detection section is directed toward the display region.

According to the above configuration, the visual line direction of the driver of the vehicle is detected by the visual line direction detection section. The display controller controls the display section so as to display the picture across the entirety of the display region in cases in which a visual line direction of the driver of the vehicle detected by the visual line direction detection section is directed toward the display region, and controls the display section so as to display the picture at reduced size in the predetermined partial region of the display region in cases other than cases in which the visual line direction of the driver of the vehicle detected by the visual line direction detection section is directed toward the display region. This thereby enables the picture in the display region to be made less prominent when the driver is not looking at the picture in the display region.

An onboard display device control method of a sixth aspect is a control method for an onboard display device including a display section, a first image capture section, and a second image capture section. The display section includes a display region set on a front passenger seat side of a vehicle width direction center position at a front face side of a vehicle cabin, and is capable of displaying a picture in the display region. The first image capture section is disposed at a vehicle side section on the front passenger seat side and captures images of a vehicle rearward. The second image capture section is disposed at a vehicle rear end section and captures images of the vehicle rearward in an imaging range partially overlapping with an imaging range of the first image capture section. The control method includes converting a second image captured by the second image capture section to a point-of-view-converted image viewed as if from a hypothetical point-of-view at an installation position of the first image capture section, and stitching a first image captured by the first image capture section together with an image from a range in the point-of-view-converted image not overlapping with the first image to generate a composite image. The control method further includes using the display section to display the composite image in the display region as the picture. Similarly to the first aspect, this thereby enables ease of viewing of the displayed picture to be improved.

An onboard display device control method of a seventh aspect is a control method for an onboard display device including a display section, a first image capture section, and a second image capture section. The display section includes a display region set on a front passenger seat side of a vehicle width direction center position at a front face side of a vehicle cabin, and is capable of displaying a picture in the display region. The display region includes a first display region and a second display region disposed at a vehicle width direction inner side of the first display region so as to lie in a row with the first display region with a non-display region therebetween. The first image capture section is disposed at a vehicle side section on the front passenger seat side and captures images of a vehicle rearward. The second image capture section is disposed at a vehicle rear end section, and captures images of the vehicle rearward in an imaging range partially overlapping with an imaging range of the first image capture section. The control method includes converting a second image captured by the second image capture section to a point-of-view-converted image viewed as if from a hypothetical point-of-view at an installation position of the first image capture section, stitching a first image captured by the first image capture section together with an image from a range in the point-of-view-converted image not overlapping with the first image to generate a composite image, and associating an overall region of the composite image with a region combining the first display region, the non-display region, and the second display region. The control method further includes extracting from the composite image an image region corresponding to the first display region to generate a first trimmed image, and extracting from the composite image an image region corresponding to the second display region to generate a second trimmed image. Moreover, the control method further includes using the display section to display the first trimmed image in the first display region as the picture, and using the display section to display the second trimmed image in the second display region as the picture. Similarly to the second aspect, this thereby enables ease of viewing of the displayed picture to be improved.

An onboard display device control program of an eighth aspect is a control program for an onboard display device including a display section, a first image capture section, and a second image capture section. The display section includes a display region set on a front passenger seat side of a vehicle width direction center position at a front face side of a vehicle cabin, and is capable of displaying a picture in the display region. The first image capture section is disposed at a vehicle side section on the front passenger seat side, and captures images of a vehicle rearward. The second image capture section is disposed at a vehicle rear end section, and captures images of the vehicle rearward in an imaging range partially overlapping with an imaging range of the first image capture section. The control program causes a computer to execute processing, the processing including converting a second image captured by the second image capture section to a point-of-view-converted image viewed as if from a hypothetical point-of-view at an installation position of the first image capture section, stitching a first image captured by the first image capture section together with an image from a range in the point-of-view-converted image not overlapping with the first image to generate a composite image, and using the display section to display the composite image in the display region as the picture. The computer accordingly executes the onboard display device control program according to the eighth aspect, such that the computer implements the onboard display device control method of the sixth aspect. This enables ease of viewing of the displayed picture to be improved, similarly to the first aspect and the sixth aspect.

An onboard display device control program of a ninth aspect is a control program for an onboard display device including a display section, a first image capture section, and a second image capture section. The display section includes a display region set on a front passenger seat side of a vehicle width direction center position at a front face side of a vehicle cabin, and is capable of displaying a picture in the display region. The display region includes a first display region and a second display region disposed at a vehicle width direction inner side of the first display region so as to lie in a row with the first display region with a non-display region therebetween. The first image capture section is disposed at a vehicle side section on the front passenger seat side and captures images of a vehicle rearward. The second image capture section is disposed at a vehicle rear end section, and captures images of the vehicle rearward in an imaging range partially overlapping with an imaging range of the first image capture section. The control program causes a computer to execute processing, the processing including converting a second image captured by the second image capture section to a point-of-view-converted image viewed as if from a hypothetical point-of-view at an installation position of the first image capture section, stitching a first image captured by the first image capture section together with an image from a range in the point-of-view-converted image not overlapping with the first image to generate a composite image, and associating an overall region of the composite image with a region combining the first display region, the non-display region, and the second display region. The processing further includes extracting from the composite image an image region corresponding to the first display region to generate a first trimmed image, and extracting from the composite image an image region corresponding to the second display region to generate a second trimmed image. Moreover, the processing also includes using the display section to display the first trimmed image in the first display region as the picture, and using the display section to display the second trimmed image in the second display region as the picture. The computer accordingly executes the onboard display device control program according to the ninth aspect such that the computer implements the onboard display device control method of the seventh aspect. This thereby enables ease of viewing of the displayed picture to be improved, similarly to the seventh aspect.

As described above, the present disclosure exhibits the excellent advantageous effect of enabling an improvement in the ease of viewing a displayed picture.

The invention claimed is:

1. An onboard display device comprising:
    a display that includes a display region at a front passenger seat side of a vehicle width direction center position at a front face side of a vehicle cabin and the entire display region is positioned between the vehicle width direction center position and a vehicle side section of the front passenger seat side, and that is capable of displaying a picture in the display region;
    a first image capture section that is disposed at a vehicle side on the front passenger seat side and that captures images of a vehicle rearward;
    a second image capture section that is disposed at a vehicle rear end, and that captures images of the vehicle rearward in an imaging range partially overlapping with an imaging range of the first image capture section; and
    a display controller that converts a second image captured by the second image capture section to a point-of-view-converted image viewed as if from a hypothetical point-of-view at an installation position of the first image capture section, that stitches a first image captured by the first image capture section with an image from a range in the point-of-view-converted image not overlapping with the first image to generate a composite image, and that controls the display so as to display the composite image in the display region as the picture,
    wherein the display region is set such that in vehicle plan view an imaginary straight line passing through an anticipated driver-eye position and a vehicle width direction position corresponding to a terminal position at the vehicle width direction inner side of the front passenger seat at a front end of a vehicle interior ceiling passes through a range extending from a vehicle width direction inner end of a first range where the picture based on the first image is displayed to a vehicle width direction outer end of a second range where the picture based on the second image is displayed.

2. The onboard display device of claim 1, wherein a light control film that makes the picture in the display region visible only from a driving seat side is placed over a surface of the display region.

3. The onboard display device of claim 1, further comprising:
    a visual line direction detection sensor that detects a visual line direction of a driver of the vehicle, wherein the display controller controls the display so as to display the picture across an entirety of the display region in a case in which a visual line direction of the driver of the vehicle detected by the visual line direction detection sensor is directed toward the display region, and controls the display so as to display the picture at reduced size in a predetermined partial region of the display region in a case other than the case in which the visual line direction of the driver of the vehicle detected by the visual line direction detection sensor is directed toward the display region.

4. An onboard display device comprising:
    a display that includes a display region set on a front passenger seat side of a vehicle width direction center position at a front face side of a vehicle cabin and the entire display region is positioned between the vehicle width direction center position and a vehicle side section of the front passenger seat side, positioned between the vehicle width direction center position and a vehicle side section of the front passenger seat side, and that is capable of displaying a picture in the display region, the display region including a first display region and a second display region disposed at a vehicle width direction inner side of the first display region so as to lie in a row with the first display region, with a non-display region therebetween;
    a first image capture section that is disposed at a vehicle side on the front passenger seat side and that captures images of a vehicle rearward;
    a second image capture section that is disposed at a vehicle rear end, and that captures images of the vehicle rearward in an imaging range partially overlapping with an imaging range of the first image capture section; and
    a display controller that converts a second image captured by the second image capture section to a point-of-view-converted image viewed as if from a hypothetical point-of-view at an installation position of the first image capture section, that stitches a first image captured by the first image capture section with an image from a range in the point-of-view-converted image not overlapping with the first image to generate a composite image, that associates an overall region of the composite image with a region combining the first display region, the non-display region, and the second display region, that extracts from the composite image an image region corresponding to the first display region to generate a first trimmed image and extracts from the composite image an image region corresponding to the second display region to generate a second trimmed image, and that controls the display so as to display the first trimmed image in the first display region as the picture and controls the display so as to display the second trimmed image in the second display region as the picture, wherein the display region is set such that in vehicle plan view an imaginary straight line passing through an anticipated driver-eye position and a vehicle width direction position corresponding to a terminal position at the vehicle width direction inner side of the front passenger seat at a front end of a vehicle interior ceiling passes through a range extending from a vehicle width direction inner end of a first range where the picture based on the first image is displayed to a vehicle width direction outer end of a second range where the picture based on the second image is displayed.

5. The onboard display device of claim 4, wherein a light control film that makes the picture in the display region visible only from a driving seat side is placed over a surface of the display region.

6. The onboard display device of claim 4, further comprising:
a visual line direction detection sensor that detects a visual line direction of a driver of the vehicle, wherein the display controller controls the display so as to display the picture across an entirety of the display region in a case in which a visual line direction of the driver of the vehicle detected by the visual line direction detection sensor is directed toward the display region, and controls the display so as to display the picture at reduced size in a predetermined partial region of the display region in a case other than the case in which the visual line direction of the driver of the vehicle detected by the visual line direction detection sensor is directed toward the display region.

7. A control method for an onboard display device that includes:
a display that includes a display region set on a front passenger seat side of a vehicle width direction center position at a front face side of a vehicle cabin and the entire display region is positioned between the vehicle width direction center position and a vehicle side section of the front passenger seat side, positioned between the vehicle width direction center position and a vehicle side section of the front passenger seat side, and that is capable of displaying a picture in the display region;
a first image capture section that is disposed at a vehicle side on the front passenger seat side and that captures images of a vehicle rearward; and
a second image capture section that is disposed at a vehicle rear end, and that captures images of the vehicle rearward in an imaging range partially overlapping with an imaging range of the first image capture section,
the control method comprising:
converting a second image captured by the second image capture section to a point-of-view-converted image viewed as if from a hypothetical point-of-view at an installation position of the first image capture section, stitching a first image captured by the first image capture section with an image from a range in the point-of-view-converted image not overlapping with the first image to generate a composite image, and using the display to display the composite image in the display region as the picture, wherein the display region is set such that in vehicle plan view an imaginary straight line passing through an anticipated driver-eye position and a vehicle width direction position corresponding to a terminal position at the vehicle width direction inner side of the front passenger seat at a front end of a vehicle interior ceiling passes through a range extending from a vehicle width direction inner end of a first range where the picture based on the first image is displayed to a vehicle width direction outer end of a second range where the picture based on the second image is displayed.

8. The onboard display device control method of claim 7, further comprising:
detecting a visual line direction of a driver of the vehicle; and
controlling the display so as to display the picture across an entirety of the display region in a case in which a detected visual line direction of the driver of the vehicle is directed toward the display region, and controlling the display so as to display the picture at reduced size in a predetermined partial region of the display region in a case other than the case in which the detected visual line direction of the driver of the vehicle is directed toward the display region.

9. A control method for an onboard display device that includes:
a display that includes a display region set on a front passenger seat side of a vehicle width direction center position at a front face side of a vehicle cabin and the entire display region is positioned between the vehicle width direction center position and a vehicle side section of the front passenger seat side positioned between the vehicle width direction center position and a vehicle side section of the front passenger seat side, and that is capable of displaying a picture in the display region, the display region including a first display region and a second display region disposed at a vehicle width direction inner side of the first display region so as to lie in a row with the first display region, with a non-display region therebetween;
a first image capture section that is disposed at a vehicle side on the front passenger seat side and that captures images of a vehicle rearward; and
a second image capture section that is disposed at a vehicle rear end, and that captures images of the vehicle rearward in an imaging range partially overlapping with an imaging range of the first image capture section,
the control method comprising:
converting a second image captured by the second image capture section to a point-of-view-converted image viewed as if from a hypothetical point-of-view at an installation position of the first image capture section, stitching a first image captured by the first image capture section with an image from a range in the point-of-view-converted image not overlapping with the first image to generate a composite image, associating an overall region of the composite image with a region combining the first display region, the non-display region, and the second display region, extracting from the composite image an image region corresponding to the first display region to generate a first trimmed image and extracting from the composite image an image region corresponding to the second display region to generate a second trimmed image, and using the display to display the first trimmed image in the first display region as the picture and using the display to display the second trimmed image in the second display region as the picture, wherein the display region is set such that in vehicle plan view an imaginary straight line passing through an anticipated driver-eye position and a vehicle width direction position corresponding to a terminal position at the vehicle width direction inner side of the front passenger seat at a front end of a vehicle interior ceiling passes through a range extending from a vehicle width direction inner end of a first range where the picture based on the first image is displayed to a vehicle width direction outer end of a second range where the picture based on the second image is displayed.

10. The onboard display device control method of claim 9, further comprising:
detecting a visual line direction of a driver of the vehicle; and
controlling the display so as to display the picture across an entirety of the display region in a case in which a detected visual line direction of the driver of the vehicle is directed toward the display region, and controlling the display so as to display the picture at reduced size in a predetermined partial region of the display region in a case other than the case in which the detected visual line direction of the driver of the vehicle is directed toward the display region.

11. A non-transitory storage medium that stores a control program for an onboard display device that includes:
a display that includes a display region set on a front passenger seat side of a vehicle width direction center position at a front face side of a vehicle cabin and the entire display region is positioned between the vehicle width direction center position and a vehicle side section of the front passenger seat side, positioned between the vehicle width direction center position and a vehicle side section of the front passenger seat side, and that is capable of displaying a picture in the display region;
a first image capture section that is disposed at a vehicle side on the front passenger seat side and that captures images of a vehicle rearward; and
a second image capture section that is disposed at a vehicle rear end, and that captures images of the vehicle rearward in an imaging range partially overlapping with an imaging range of the first image capture section,
the control program being executable by a computer included in the onboard display device to perform processing, the processing comprising:
converting a second image captured by the second image capture section to a point-of-view-converted image viewed as if from a hypothetical point-of-view at an installation position of the first image capture section, stitching a first image captured by the first image capture section with an image from a range in the point-of-view-converted image not overlapping with the first image to generate a composite image, and using the display to display the composite image in the display region as the picture,
wherein the display region is set such that in vehicle plan view an imaginary straight line passing through an anticipated driver-eye position and a vehicle width direction position corresponding to a terminal position at the vehicle width direction inner side of the front passenger seat at a front end of a vehicle interior ceiling passes through a range extending from a vehicle width direction inner end of a first range where the picture based on the first image is displayed to a vehicle width direction outer end of a second range where the picture based on the second image is displayed.

12. The non-transitory storage medium of claim 11, wherein the processing further comprises:
detecting a visual line direction of a driver of the vehicle; and
controlling the display so as to display the picture across an entirety of the display region in a case in which a detected visual line direction of the driver of the vehicle is directed toward the display region, and controlling the display to display the picture at reduced size in a predetermined partial region of the display region in a case other than the case in which the detected visual line direction of the driver of the vehicle is directed toward the display region.

13. A non-transitory storage medium that stores a control program for an onboard display device that includes:
a display that includes a display region set on a front passenger seat side of a vehicle width direction center position at a front face side of a vehicle cabin and the entire display region is positioned between the vehicle width direction center position and a vehicle side section of the front passenger seat side, positioned between the vehicle width direction center position and a vehicle side section of the front passenger seat side, and that is capable of displaying a picture in the display region, the display region including a first display region and a second display region disposed at a vehicle width direction inner side of the first display region so as to lie in a row with the first display region, with a non-display region therebetween;
a first image capture section that is disposed at a vehicle side on the front passenger seat side and that captures images of a vehicle rearward; and
a second image capture section that is disposed at a vehicle rear end, and that captures images of the vehicle rearward in an imaging range partially overlapping with an imaging range of the first image capture section,
the control program being executable by a computer included in the onboard display device to perform processing, the processing comprising:
converting a second image captured by the second image capture section to a point-of-view-converted image viewed as if from a hypothetical point-of-view at an installation position of the first image capture section, stitching a first image captured by the first image capture section with an image from a range in the point-of-view-converted image not overlapping with the first image to generate a composite image, associating an overall region of the composite image with a region combining the first display region, the non-display region, and the second display region, extracting from the composite image an image region corresponding to the first display region to generate a first trimmed image and extracting from the composite image an image region corresponding to the second display region to generate a second trimmed image, and using the display to display the first trimmed image in the first display region as the picture and using the display to display the second trimmed image in the second display region as the picture, wherein the display region is set such that in vehicle plan view an imaginary straight line passing through an anticipated driver-eye position and a vehicle width direction position corresponding to a terminal position at the vehicle width direction inner side of the front passenger seat at a front end of a vehicle interior ceiling passes through a range extending from a vehicle width direction inner end of a first range where the picture based on the first image is displayed to a vehicle width direction outer end of a second range where the picture based on the second image is displayed.

14. The non-transitory storage medium of claim 13, wherein the processing further comprises:
detecting a visual line direction of a driver of the vehicle; and
controlling the display so as to display the picture across an entirety of the display region in a case in which a detected visual line direction of the driver of the vehicle is directed toward the display region, and controlling the display to display the picture at reduced size in a predetermined partial region of the display region in a case other than the case in which the detected visual line direction of the driver of the vehicle is directed toward the display region.

15. The onboard display device of claim 1, wherein the display region further includes a first display region and a second display region disposed at a vehicle width direction inner side of the first display region so as to lie in a row with the first display region, with a non-display region therebetween.

16. The onboard display device control method of claim 7, wherein the display region further includes a first display region and a second display region disposed at a vehicle width direction inner side of the first display region so as to lie in a row with the first display region, with a non-display region therebetween.

17. The non-transitory storage medium of claim 11, wherein the display region further includes a first display region and a second display region disposed at a vehicle width direction inner side of the first display region so as to lie in a row with the first display region, with a non-display region therebetween.

* * * * *

UNITED STATES PATENT AND TRADEMARK OFFICE
CERTIFICATE OF CORRECTION

PATENT NO. : 10,843,628 B2  
APPLICATION NO. : 15/888784  
DATED : November 24, 2020  
INVENTOR(S) : Masashi Kawamoto and Takayuki Aoki It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Okazaki" and insert --Okazaki-shi Aichi-ken--, therefor.

Item (72), inventor 2, city, delete "Toyota" and insert --Toyota-shi Aichi-ken--, therefor.

Item (73), assignee, city, delete "Toyota" and insert --Toyota-shi Aichi-ken--, therefor.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*